United States Patent
Araumi et al.

(10) Patent No.: US 12,166,413 B2
(45) Date of Patent: Dec. 10, 2024

(54) INTEGRATED CIRCUIT AND POWER SUPPLY CIRCUIT

(71) Applicant: FUJI ELECTRIC CO., LTD., Kawasaki (JP)

(72) Inventors: Ryuunosuke Araumi, Hino (JP); Ryuji Yamada, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 223 days.

(21) Appl. No.: 17/876,337

(22) Filed: Jul. 28, 2022

(65) Prior Publication Data
US 2023/0088626 A1   Mar. 23, 2023

(30) Foreign Application Priority Data

Sep. 17, 2021 (JP) .................... 2021-151707
Dec. 22, 2021 (JP) .................... 2021-208288

(51) Int. Cl.
| | |
|---|---|
| H02M 1/42 | (2007.01) |
| H02M 1/00 | (2006.01) |
| H02M 1/08 | (2006.01) |
| H02M 3/156 | (2006.01) |
| H02M 7/217 | (2006.01) |

(52) U.S. Cl.
CPC ....... H02M 1/4225 (2013.01); H02M 1/0003 (2021.05); H02M 1/0009 (2021.05); H02M 1/0012 (2021.05); H02M 1/08 (2013.01); H02M 3/156 (2013.01); H02M 7/217 (2013.01)

(58) Field of Classification Search
CPC .... H02M 1/42; H02M 1/4208; H02M 1/4225; H02M 3/156; H02M 1/0003
See application file for complete search history.

(56) References Cited

U.S. PATENT DOCUMENTS

| | | | |
|---|---|---|---|
| 7,116,090 B1 | 10/2006 | Yang et al. | |
| 2020/0212793 A1* | 7/2020 | Yamada | ............ H02M 1/4225 |
| 2020/0251989 A1* | 8/2020 | Yamada | ............ H02M 1/4225 |

FOREIGN PATENT DOCUMENTS

| | | |
|---|---|---|
| JP | 2008-199896 A | 8/2008 |
| JP | 2017-028778 A | 2/2017 |

* cited by examiner

*Primary Examiner* — Alex Torres-Rivera
(74) *Attorney, Agent, or Firm* — Rabin & Berdo, P.C.

(57) ABSTRACT

An integrated circuit for a power supply circuit, including: a first command value output circuit outputting a first command value to turn on a transistor of the power supply circuit for a first time period; an on signal output circuit outputting an on signal to turn on the transistor; a delay circuit delaying the on signal by a predetermined time period; a correction circuit correcting the first command value, to output a second command value to turn on the transistor for a second time period; and a driver circuit turning on and off the transistor based respectively on the delayed on-signal and the second command value. The correction circuit corrects the first command value based on the predetermined time period and a ratio between the second time period and another time period from when the transistor is turned off to when an inductor current of the power supply circuit reaches a predetermined value.

11 Claims, 29 Drawing Sheets

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application numbers Nos. 2021-151707 and 2021-208288, filed Sep. 17, 2021 and Dec. 22, 2021, respectively, of which full contents are incorporated herein by reference.

BACKGROUND

Technical Field

The present disclosure relates to an integrated circuit and a power supply circuit.

Description of the Related Art

As a power supply circuit, known is a power factor correction (PFC) circuit that turns on a transistor after a predetermined time period has elapsed since an inductor current has reached zero (see, for example, Japanese Patent Application Publication No. 2008-199896, U.S. Pat. No. 7,116,090, and Japanese Patent Application Publication No. 2017-28778).

In general, in order to reduce switching loss, an integrated circuit for controlling switching of a power factor correction circuit turns on a transistor, at a timing at which a voltage applied to the transistor decreases after an inductor current reaches zero.

When the integrated circuit turns on the transistor after a predetermined time period has elapsed since the inductor current has reached zero, switching loss decreases, but the power factor of the power supply circuit may deteriorate since the inductor current becomes negative.

SUMMARY

A first aspect of an embodiment of the present disclosure is an integrated circuit for a power supply circuit that generates an output voltage at a target level from an alternating current (AC) voltage inputted thereto, the power supply circuit including an inductor configured to receive a rectified voltage corresponding to the AC voltage, and a transistor configured to control an inductor current flowing through the inductor, the integrated circuit being configured to control switching of the transistor, the integrated circuit comprising: a first command value output circuit configured to output a first command value to turn on the transistor for a first time period, based on a difference between a first voltage corresponding to the output voltage and a reference voltage; an on signal output circuit configured to output an on signal to turn on the transistor, in response to the inductor current decreasing to or below a predetermined value after turning-off of the transistor; a delay circuit configured to delay the on signal by a predetermined time period to thereby generate a delayed on-signal; a correction circuit configured to correct the first command value, to output a resultant value as a second command value to turn on the transistor for a second time period longer than the first time period; and a driver circuit configured to turn on the transistor based on the delayed on-signal, and turn off the transistor based on the second command value, wherein the correction circuit corrects the first command value based on the predetermined time period and a ratio, the ratio being based on the second time period, and a third time period that is a time period from when the transistor is turned off to when the inductor current reaches the predetermined value.

A second aspect of an embodiment of the present disclosure is an integrated circuit for a power supply circuit that generates an output voltage at a target level from an alternating current (AC) voltage inputted thereto, the power supply circuit including an inductor configured to receive a rectified voltage corresponding to the AC voltage, and a transistor configured to control an inductor current flowing through the inductor, the integrated circuit being configured to control switching of the transistor, the integrated circuit comprising: a first command value output circuit configured to output a first command value to turn on the transistor for a first time period, based on a difference between a first voltage corresponding to the output voltage and a reference voltage; an on signal output circuit configured to output an on signal to turn on the transistor, in response to the inductor current decreasing to or below a predetermined value after turning-off of the transistor; a delay circuit configured to delay the on signal by a predetermined time period to thereby generate a delayed on-signal; a correction circuit configured to correct the first command value, to output a resultant value as a second command value to turn on the transistor for a second time period longer than the first time period; a driver circuit configured to turn on the transistor based on the delayed on-signal, and turn off the transistor based on the second command value; and a second estimation circuit configured to estimate the rectified voltage, based on the first voltage, the second time period, and a third time period, the third time period being a time period from when the transistor is turned off to when the inductor current reaches the predetermined value, wherein the correction circuit corrects the first command value, based on the first voltage, the estimated rectified voltage, and the predetermined time period.

A third aspect of an embodiment of the present disclosure is a power supply circuit configured to generate an output voltage at a target level from an alternating current (AC) voltage inputted thereto, the power supply circuit comprising: an inductor configured to receive a rectified voltage corresponding to the AC voltage; a transistor configured to control an inductor current flowing through the inductor; and an integrated circuit configured to control switching of the transistor, wherein the integrated circuit includes a first command value output circuit configured to output a first command value to turn on the transistor for a first time period, based on a difference between a first voltage corresponding to the output voltage and a reference voltage, an on signal output circuit configured to output an on signal to turn on the transistor, in response to the inductor current decreasing to or below a predetermined value after turning-off of the transistor, a delay circuit configured to delay the on signal by a predetermined time period to thereby generate a delayed on-signal, a correction circuit configured to correct the first command value, to output a resultant value as a second command value to turn on the transistor for a second time period longer than the first time period, and a driver circuit configured to turn on the transistor based on the delayed on-signal, and turn off the transistor based on the second command value, and wherein the correction circuit corrects the first command value, based on the predetermined time period and a ratio, the ratio being based on the second time period, and a third time period that is a time period from when the transistor is turned off to when the inductor current reaches the predetermined value.

A fourth aspect of an embodiment of the present disclosure is a power supply circuit configured to generate an output voltage at a target level from an alternating current (AC) voltage inputted thereto, the power supply circuit comprising: an inductor configured to receive a rectified voltage corresponding to the AC voltage; a transistor configured to control an inductor current flowing through the inductor; and an integrated circuit configured to control switching of the transistor, wherein the integrated circuit includes a first command value output circuit configured to output a first command value to turn on the transistor for a first time period, based on a difference between a first voltage corresponding to the output voltage and a reference voltage, an on signal output circuit configured to output an on signal to turn on the transistor, in response to the inductor current decreasing to or below a predetermined value after turning off of the transistor, a delay circuit configured to delay the on signal by a predetermined time period to thereby generate a delayed on-signal, a correction circuit configured to correct the first command value, to output a resultant value as a second command value to turn on the transistor for a second time period longer than the first time period, a driver circuit configured to turn on the transistor based on the delayed on-signal, and turn off the transistor based on the second command value, and a second estimation circuit configured to estimate the rectified voltage, based on the first voltage, the second time period, and a third time period, the third time period being a time period from when the transistor is turned off to when the inductor current reaches the predetermined value, and wherein the correction circuit corrects the first command value, based on the first voltage, the estimated rectified voltage, and the predetermined time period.

Note that the summary of the disclosure described above does not list all the features of the present disclosure. Sub-combinations of these features may also fall within the present disclosure.

BRIEF DESCRIPTION OF THE DRAWINGS

FIG. 1 is an example circuit diagram illustrating an AC-DC converter 10a.
FIG. 2 illustrates an example configuration of a power factor correction IC 35a.
FIG. 9 illustrates an example configuration of a correction circuit 64a.
FIG. 20 illustrates an example configuration of a rectified voltage estimation circuit 66a.
FIG. 21 illustrates the operation of a rectified voltage estimation circuit 66a.
FIG. 22 illustrates main waveforms in the operation of a rectified voltage estimation circuit 66a.

DETAILED DESCRIPTION

The present disclosure will be described below through embodiments of the disclosure, but the following embodiments are not intended to limit the disclosure according to the scope of claims. Also, not all the combinations of the features described in the embodiments are necessarily essential to the solutions of the disclosure.

A term "couple" used herein means to "electrically couple" unless otherwise noted. Also, herein, a low logic level of a voltage or a signal is referred to as low, and a high logic level of a voltage or a signal is referred to as high.

Figure 1:
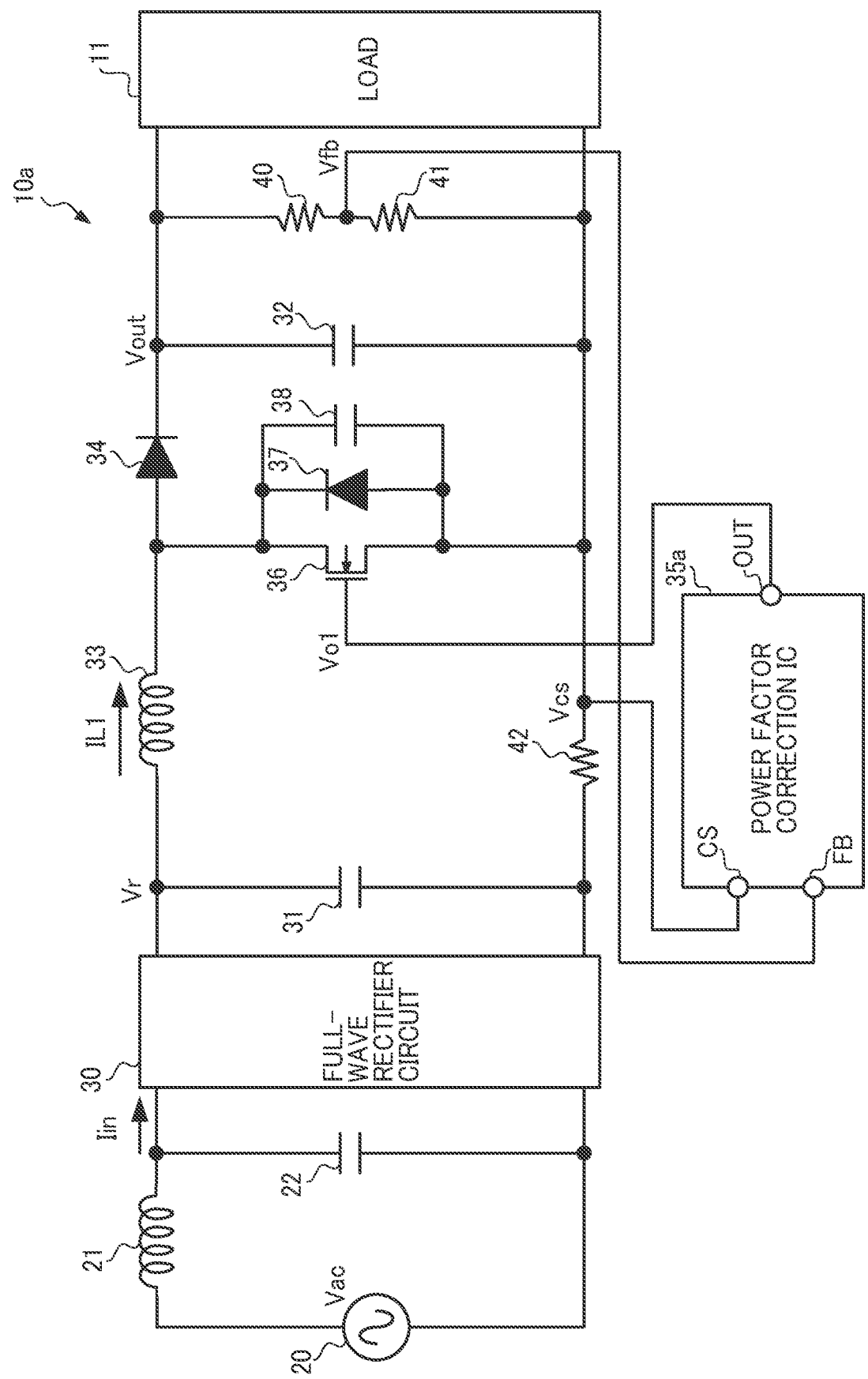

FIG. 1 illustrates an example of a circuit diagram of an AC-DC converter 10a. The AC-DC converter 10a is a boost power factor correction (PFC) circuit that generates an output voltage Vout at a target level from an alternating-current (AC) voltage Vac inputted thereto from a commercial power supply. The output voltage Vout generated by the AC-DC converter 10a is used to drive a load 11.

The load 11 is, for example, a DC-DC converter or an electronic device operated by a direct-current (DC) voltage.

<<Configuration of AC-DC Converter 10a>>

The AC-DC converter 10a includes a full-wave rectifier circuit 30, capacitors 31, 32, an inductor 33, a diode 34, a power factor correction IC 35a, an N-channel metal-oxide-semiconductor (NMOS) transistor 36, a body diode 37, a parasitic capacitor 38, and resistors 40 to 42.

==Input to Full-Wave Rectifier Circuit 30==

An alternating-current (AC) power supply 20 is a commercial AC power supply to supply the AC voltage Vac to the full-wave rectifier circuit 30. For example, the AC voltage Vac is a voltage in a range from 100 V to 277 V with a frequency in a range from 50 Hz to 60 Hz.

An inductor 21 is a so-called power supply inductance that the AC power supply 20 has in a current Iin supplied from the AC power supply 20 to the full-wave rectifier circuit 30. FIG. 1 illustrates the inductor 21 on only one of paths connecting the AC power supply 20 and the full-wave rectifier circuit 30 and omits the power supply inductance on the other of the paths.

Together with the inductor 21, a capacitor 22 removes noise in the current Iin supplied from the AC power supply 20 to the full-wave rectifier circuit 30. Noise is removed from the current Iin supplied to the full-wave rectifier circuit 30 by the inductor 21 and the capacitor 22.

==Configuration from Full-Wave Rectifier Circuit 30 to the Load 11==

The full-wave rectifier circuit 30 full-wave rectifies the predetermined AC voltage Vac inputted thereto, and outputs a resultant voltage to the capacitor 31 and the inductor 33 as a rectified voltage Vr. The rectified voltage Vr corresponding to the AC voltage Vac is applied to the inductor 33.

The capacitor 31 smooths the rectified voltage Vr supplied from the full-wave rectifier circuit 30.

The capacitor 32 configures a boost chopper circuit together with the inductor 33, the diode 34, and the NMOS transistor 36. This boosts a charge voltage of the capacitor 32 to the DC output voltage Vout, and supply a resultant voltage to the load 11.

The power factor correction integrated circuit (IC) 35a is an integrated circuit that controls switching of the NMOS transistor 36 such that the level of the output voltage Vout reaches a target level (for example, 400 V) while correcting the power factor of the AC-DC converter 10a.

The power factor correction IC 35a has terminals CS, FB, and OUT. Note that the power factor correction IC 35a has terminals other than the terminals CS, FB, and OUT (for example, a power supply terminal, a GND terminal, and the like), but FIG. 1 omits those terminals.

The NMOS transistor 36 is a power transistor to control the power to the load 11 of the AC-DC converter 10a. The NMOS transistor 36 controls an inductor current IL1 flowing through the inductor 33.

It is assumed here that the NMOS transistor 36 is an N-type (metal oxide semiconductor) transistor, but may instead be a P-type transistor. The NMOS transistor 36 may also be a transistor of one of other types, such as a bipolar transistor.

The gate electrode of the NMOS transistor 36 is coupled to the terminal OUT, to thereby be controlled by a voltage Vo1 from the power factor correction IC 35a. The NMOS transistor 36 has the body diode 37 and the parasitic capacitor 38.

The body diode 37 is formed by a pn junction between the drain and the source of the NMOS transistor 36, and is a parasitic diode. The body diode 37 contributes to the reverse recovery characteristics. When the NMOS transistor 36 is off, the body diode 37 has an effect as a parasitic element together with the parasitic capacitor 38.

The parasitic capacitor 38 is a parasitic capacitance between the drain and the source of the NMOS transistor 36. The AC-DC converter 10a has a parasitic capacitance therein that causes resonance together with the inductance of the inductor 33 when the NMOS transistor 36 is turned off.

The parasitic capacitor 38 is an example of a parasitic capacitance that causes resonance together with the inductance of the inductor 33.

The resistors 40, 41 configure a voltage divider circuit that divides the output voltage Vout, to thereby generate a voltage Vfb. The voltage divider circuit configured with the resistors 40, 41 applies the divided voltage Vfb to the terminal FB of the power factor correction IC 35a as a feedback voltage.

The resistor 42 is a resistor to detect the inductor current IL1. A voltage Vcs corresponding to the inductor current IL1 is generated across the resistor 42. The terminal CS of the power factor correction IC 35a is coupled to one end of the resistor 42.

Note that the AC-DC converter 10a corresponds to a "power supply circuit," the power factor correction IC 35a corresponds to an "integrated circuit," and the voltage Vfb corresponds to a "first voltage."

<<Power Factor Correction IC 35a>>

Figure 2:
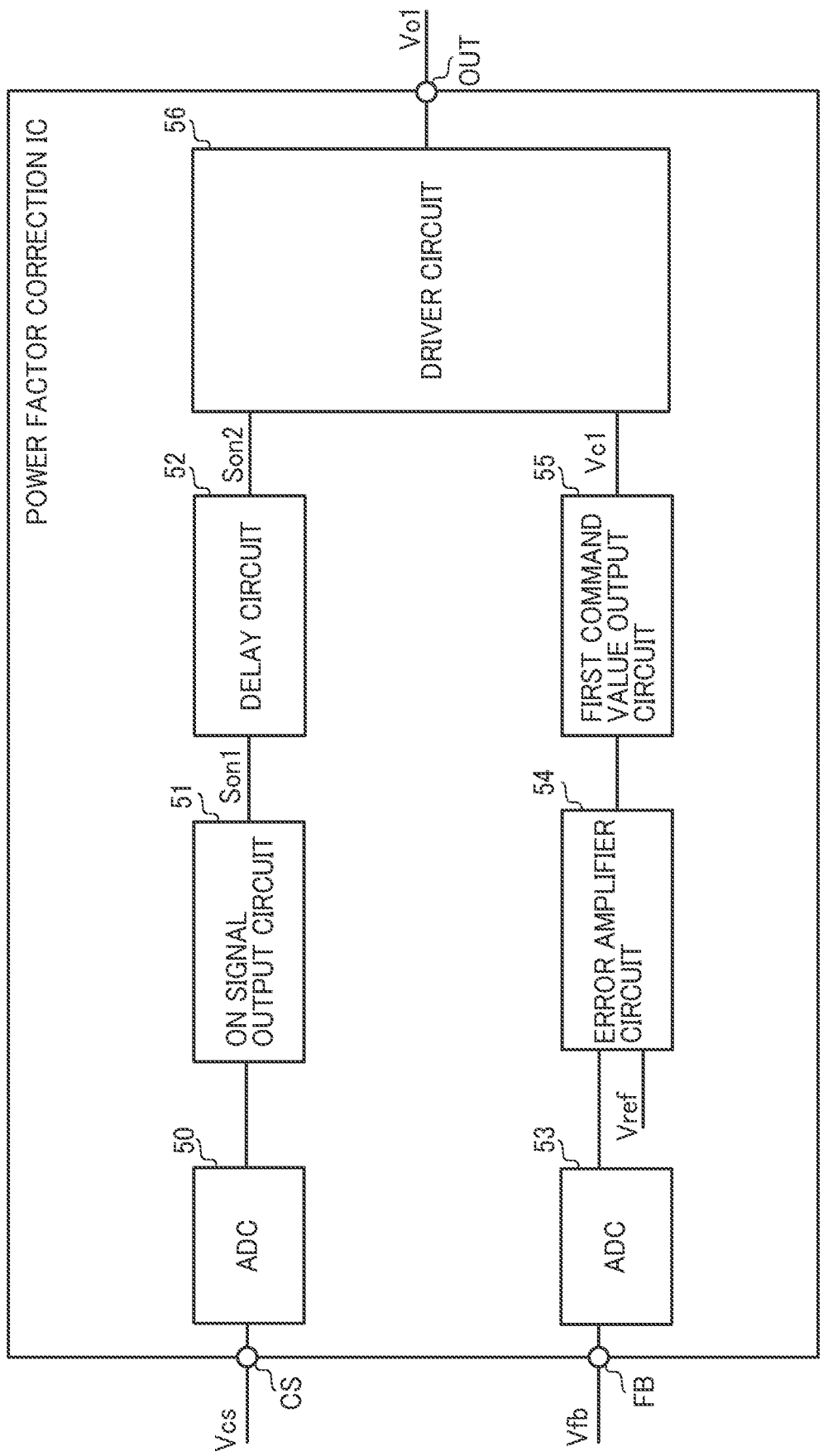

FIG. 2 illustrates an example configuration of the power factor correction IC 35a. The power factor correction IC 35a includes analog-to-digital converters (ADCs) 50, 53, an on signal output circuit 51, a delay circuit 52, an error amplifier circuit 54, a first command value output circuit 55, a driver circuit 56, and terminals CS, FB, OUT.

The ADC 50 converts the voltage Vcs, which corresponds to the inductor current IL1 and is applied to the terminal CS, into a digital value. In the following, the digital value outputted from the ADC 50 is referred to as the voltage Vcs, for convenience.

Based on the voltage Vcs, the on signal output circuit 51 detects that the inductor current IL1 is substantially zero in response to the inductor current IL1 dropping to or below a predetermined current value I0 (for example, several milliamperes) slightly above zero. Then, in response to the inductor current IL1 reaching substantially zero (hereinafter, "substantially zero" is simply referred to as "0" (zero)), the on signal output circuit 51 outputs an on signal Son1 to turn on the NMOS transistor 36. As an example, the on signal Son1 is a high pulse signal.

The delay circuit 52 delays the on signal Son1 by a predetermined time period Tzcd, and outputs a resultant signal as an on signal Son2. The time period Tzcd will be described later.

The ADC 53 converts the voltage Vfb applied to the terminal FB into a digital value, and outputs the digital value to the error amplifier circuit 54. In the following, the digital value outputted from the ADC 53 is referred to as the voltage Vfb, for convenience.

The error amplifier circuit 54 compares the voltage Vfb and a reference voltage Vref, and amplifies the error therebetween. The error amplifier circuit 54 outputs the amplified error to the first command value output circuit 55.

The first command value output circuit 55 outputs a first command value Vc1 to the driver circuit 56 based on the amplified error (i.e., the difference between the voltage Vfb and the reference voltage Vref). Note that the level of the first command value Vc1 (i.e., the length of a time period Ton1 during which the NMOS transistor 36 is on) is set such that an output voltage Vout at a target level is outputted from the AC-DC converter 10a.

The driver circuit 56 drives the NMOS transistor 36 based on the on signal Son2 and the first command value Vc1. Specifically, in response to receipt of the on signal Son2, the driver circuit 56 outputs a high voltage Vo1 for the time period Ton1 corresponding to the first command value Vc1. As a result, the NMOS transistor 36 is turned on.

In response to the time period Ton1 corresponding to the first command value Vc1 having elapsed since turning on of the NMOS transistor 36, the driver circuit 56 outputs a low voltage Vo1. As a result, the NMOS transistor 36 is turned off.

Although details are omitted for convenience, the driver circuit 56 includes, for example, a buffer circuit and a circuit that outputs a drive signal to turn on the NMOS transistor 36.

==Main Waveforms in AC-DC converter 10a==

Figure 3:
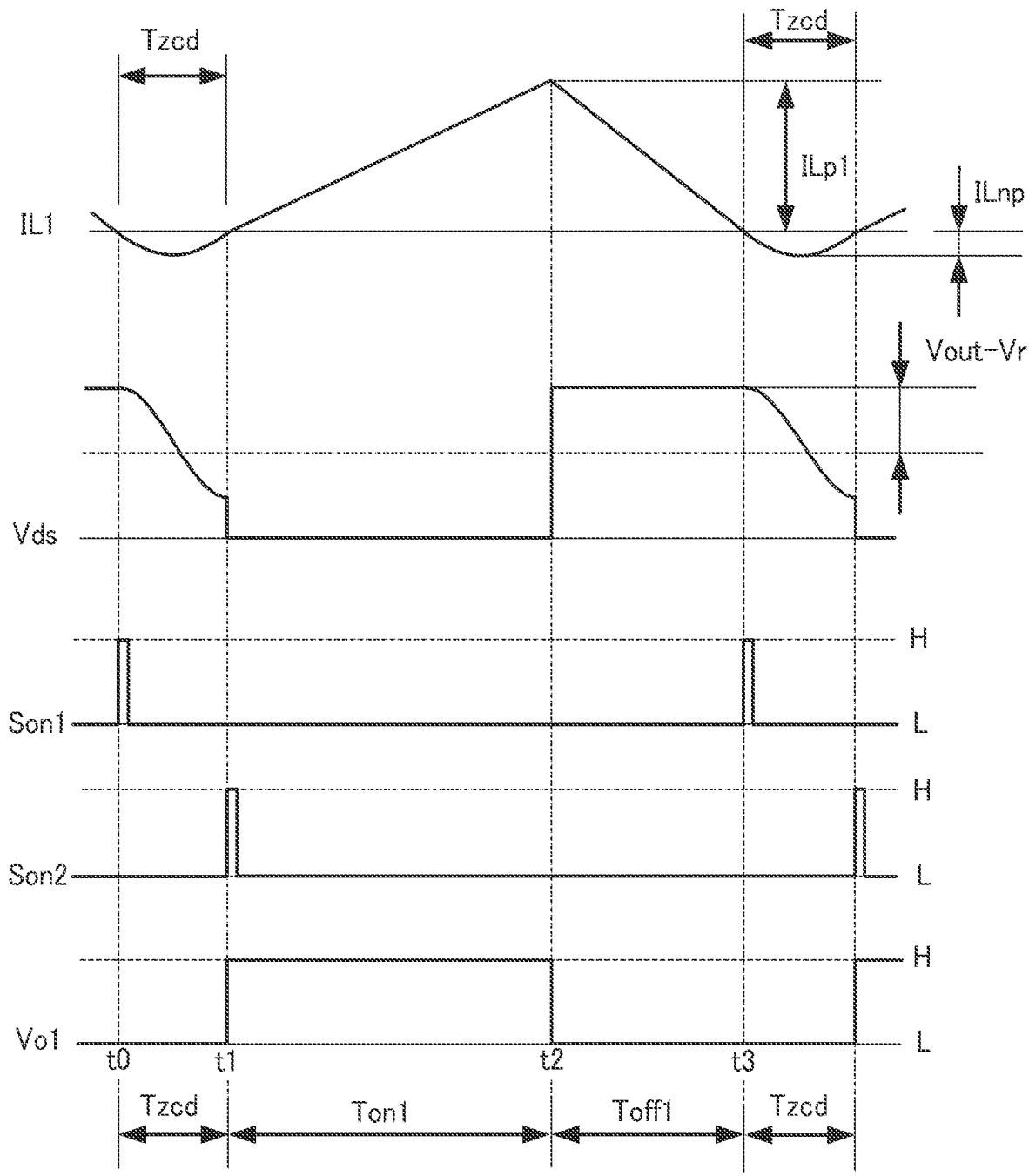
FIG. 3 is a conceptual diagram illustrating the relation among an inductor current IL1, a drain-source voltage Vds of an NMOS transistor 36, and a voltage Vo1.

The main waveforms in the AC-DC converter 10a will be described here, to explain an overview of the operation of the AC-DC converter 10a. FIG. 3 is a conceptual diagram illustrating the relations among the inductor current IL1, a drain-source voltage Vds of the NMOS transistor 36, and the voltage Vo1. Note that the following description will be given assuming that the inductor current IL1 decreases to 0 (a predetermined value) at time t0 after turning off of the NMOS transistor 36.

In response to the inductor current IL1 decreasing to 0 at time t0, the on signal output circuit 51 in FIG. 2 outputs a high on signal Son1. Note that, from time t0, the inductor current IL1 further decreases, resulting in a negative value.

Here, an "inductor current IL1 in a positive direction" means a current flowing in a direction from the one end of the inductor 33 coupled with the full-wave rectifier circuit 30 and the inductor 33, to the other end of the inductor 33 coupled with the inductor 33 and the NMOS transistor 36. In addition, an "inductor current IL1 in a negative direction" means a current flowing in a direction from the other end of the inductor 33 to the one end of the inductor 33.

Incidentally, in response to the NMOS transistor 36 being turned off and the inductor current IL1 in the positive direction decreasing to 0 at time t0, resonance occurs at the inductor 33 and the parasitic capacitor 38. As a result, the drain-source voltage Vds of the NMOS transistor 36 drops, and an inductor current IL1 in the negative direction (i.e., an inductor current IL1 of a negative value) flows. In FIG. 3, ILnp denotes the local minimum value of the negative inductor current IL1.

Then, at time t1 at which the delay time period Tzcd has elapsed since time t0, the driver circuit 56 outputs the high voltage Vo1 based on the on signal Son2 which has been delayed. Accordingly, the NMOS transistor 36 is turned on.

Note that the delay time period Tzcd is set to a time period from when the drain-source voltage Vds starts to drop to when the drain-source voltage Vds reaches the lowest value, in other words, a time period corresponding to half the resonance period. As a result, it is possible to reduce the power consumption when the NMOS transistor 36 is turns on.

At time t1, the on signal Son2 delayed by the delay circuit 52 goes high. Upon turning on of the NMOS transistor 36 in response to the high on signal Son2, the inductor current IL1 flowing through the inductor 33 increases.

Then, based on the first command value Vc1, the driver circuit 56 keeps the NMOS transistor 36 on until time t2 at which the time period Ton1 has elapsed since time t1. The inductor current IL1 reaches a local maximum value ILp1 at time t2.

Thereafter, at time t2, the driver circuit 56 outputs the low voltage Vo1. Accordingly, the NMOS transistor 36 is turned off.

Then, at time t3, the inductor current IL1 decreases to 0 again. Here, a time period from time t2 to time t3, in other words, a time period from when the NMOS transistor 36 is turned off to when the inductor current IL1 reaches 0 is referred to as time period Toff1.

The time period Ton1 corresponds to a "first period."

==Power Factor Correction and Dead Angle==

The AC-DC converter 10a described above can reduce the power consumption when the NMOS transistor 36 is turned on.

When the delay circuit 52 delays the on signal Son1 by the predetermined time period Tzcd, a negative inductor current IL1 flows through the inductor 33 for the delay time period Tzcd. Meanwhile, when the NMOS transistor 36 is switched by the driver circuit 56 based on the delayed signal Son2, the drain-source voltage Vds drops lower than the drain-source voltage Vds before the negative inductor current IL1 starts to flow. This reduces the switching loss of the NMOS transistor 36, thereby being able to reduce the power consumption.

Further, in this case, the average value of the inductor current IL1 decreases by the amount of the inductor current IL1 oscillating on the negative side during the time period Tzcd. When the inductor current IL1 is in a low phase, the overall amplitude of the inductor current IL1 becomes small, and thus the oscillation of the inductor current IL1 on the negative side greatly contributes to the average value of the inductor current IL1 and cancels out the contribution of the inductor current IL1 on the positive side. This leads to deterioration of the power factor.

Figure 4:
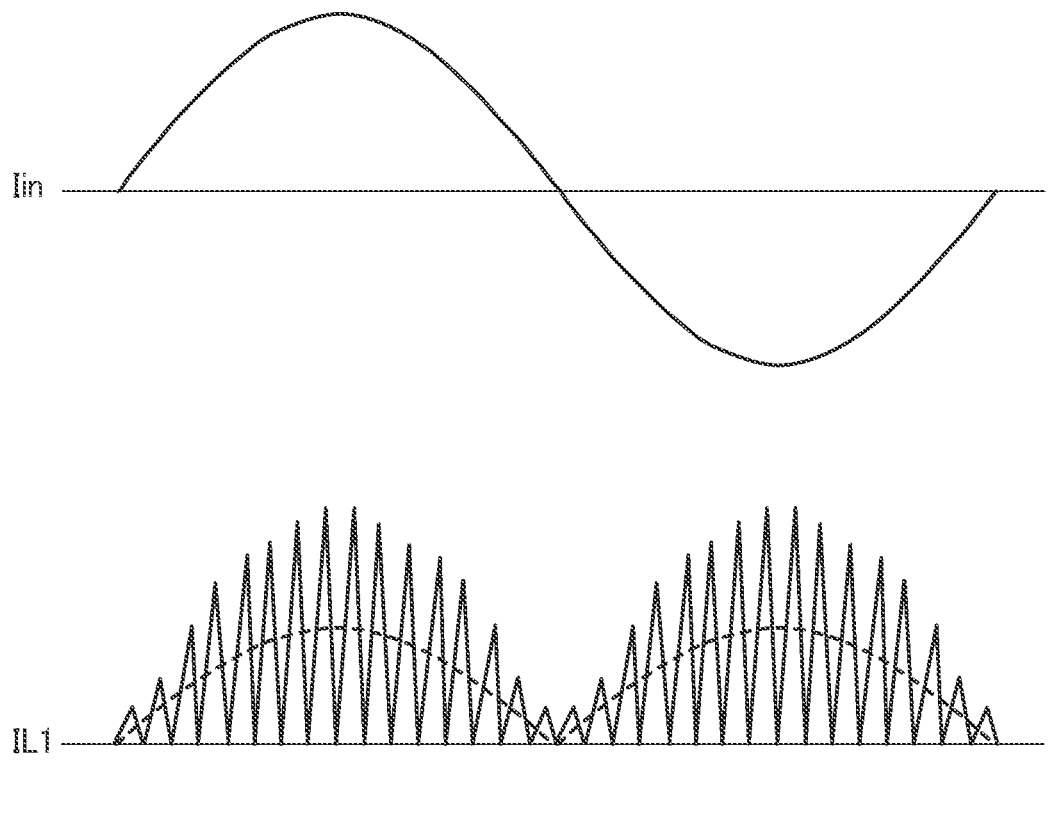
FIG. 4 illustrates the relation between an inductor current IL1 and an input current Iin when controlled without delay time period with respect to an on signal Son1.

The following specifically describes how the input current Iin in the AC-DC converter changes in each of the cases where there is no delay time period and there is a delay time period. FIG. 4 illustrates the relation between the inductor current IL1 and the input current Iin when controlled without a delay time period with respect to the on signal Son1. In FIG. 4, the average value of the inductor current IL1 is denoted by a dashed line.

===When There is No Delay Time Period===

When there is no delay time period, the NMOS transistor 36 is turned on in response to the inductor current IL1 reaching 0. Thus, the AC power supply 20 operates in a so-called critical conduction mode. Then, the time period during which the NMOS transistor 36 is on is a fixed time period corresponding to the target level.

In this case, the peak value of the inductor current IL1 changes in accordance with the rectified voltage. As a result, the average values of the inductor current IL1 (the dashed line given in the diagram of the inductor current IL1) form a positively-rectified sine waveform. Note that the average values of the inductor current IL1 form a sine waveform in a low phase as well, but the driver circuit 56 performs switching when the drain-source voltage of the NMOS transistor 36 is at a high value, which leads to an increase in switching loss.

===When There is Delay Time Period===

Figure 5:
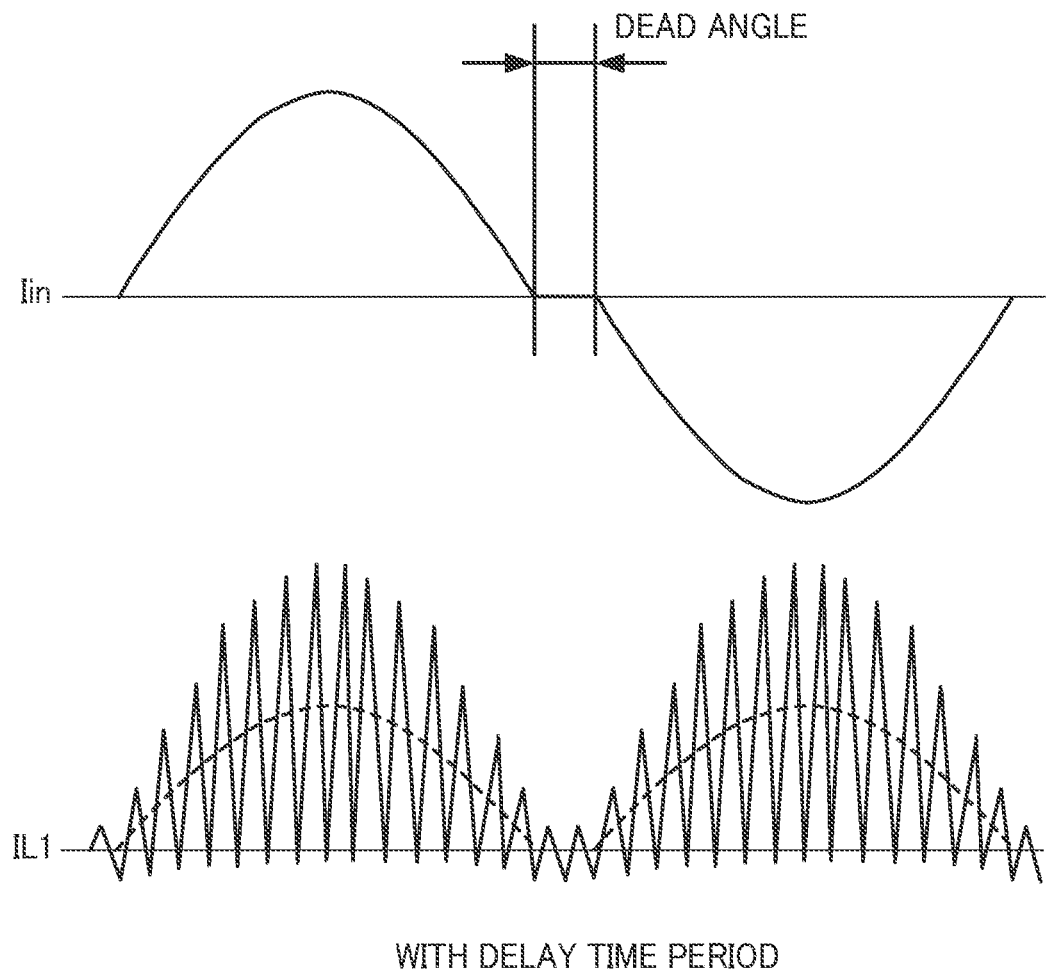
FIG. 5 illustrates the relation of an inductor current IL1 and an input current Iin when controlled based on an on signal Son2 which has been delayed with respect to an on signal Son1.

FIG. 5 illustrates the relation between the inductor current IL1 and the input current Iin when controlled based on the on-signal Son2 which has been delayed with respect to the on signal Son1. FIG. 5 illustrates an example of the inductor current IL1 and the input current Iin in the AC-DC converter 10a.

As described with reference to FIG. 3, in response to the on signal Son1 being delayed by the predetermined time period Tzcd, a negative inductor current IL1 flows through the inductor 33 during the delay time period Tzcd.

Meanwhile, the contribution of the inductor current IL1 on the positive side decreases particularly in a low phase (for example, about 0°). As a result, the contribution of the inductor current IL1 on the negative side during the delay time period and the contribution of the inductor current IL1 on the positive side during the time period Ton1 cancel out each other, which results in the average value of the inductor current IL1 flowing through the inductor 33 being about 0.

The input current Iin inputted to the full-wave rectifier circuit 30 in FIG. 1 is inputted in such a form as to be drawn by the inductor current IL1. Accordingly, in the area in which the average value of the inductor current IL1 is about 0, the input current Iin results in a value about 0 as well. This produce an area in which a current value is about 0 in an area in which the input current Iin is in a low phase.

As such, in a power factor correction IC, the area in which the current value of the input current Iin is about 0 in a low phase is referred to as dead angle. The wider the dead angle is, the more the waveform of the current is distorted from the sine waveform, resulting in deterioration in the power factor as well.

Figure 6:
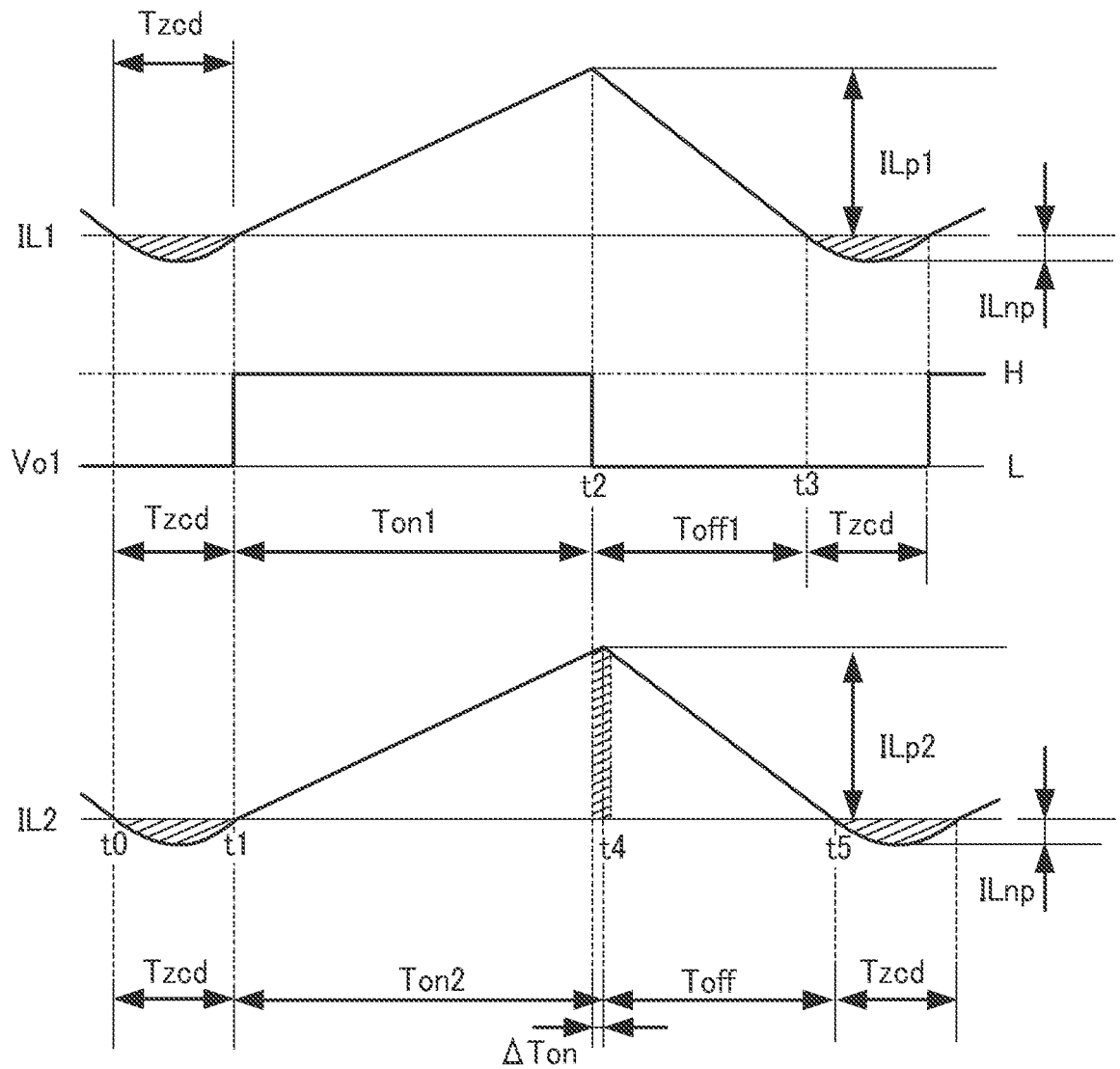
FIG. 6 is a conceptual diagram illustrating a principle of how an inductor current IL1 is corrected by a factor correction IC according to an embodiment.

FIG. 6 is a conceptual diagram illustrating the principle of how the inductor current IL1 is corrected by a power factor correction IC according to an embodiment of the present disclosure.

In FIG. 6, IL1 denotes an inductor current according to the AC-DC converter 10a, and IL2 denotes an inductor current that has been corrected by an AC-DC converter 10b, 10c of embodiments, which will be described with reference to FIGS. 7 and 12. Also, Vo1 denotes an uncorrected voltage according to the AC-DC converter 10a applied to the terminal OUT and the gate electrode of the NMOS transistor 36, and Vo2 denotes a voltage which has been corrected by the AC-DC converter 10b, 10c of embodiments, which will be described later, and applied to the terminal OUT and the NMOS transistor 36.

As has been described with reference to FIG. 3, the delay circuit 52 delays the on signal Son1 by the time period Tzcd, and outputs a resultant signal as the on signal Son2. This causes the driver circuit 56 to supply the low voltage Vo1 to turn off the NMOS transistor 36 for not only the time period Toff1 but also the time period Tzcd.

Accordingly, the inductor current IL1 decreases by the amount of the local minimum value ILnp, which generates a dead angle in the input current Iin.
==Principle of Correcting Power Factor while Providing Delay Time Period==

As described above, when a delay time period is set, the inductor current IL1 results in being negative. Thus, a time period Ton2 during which the NMOS transistor 36 is on is increased by such an amount as to cancel out the negative inductor current IL1 in a switching cycle, resulting in being able to suppress reduction in the inductor current IL1.

An AC-DC converter according to an embodiment of the present disclosure, which will be described later, set the time period Ton2 obtained by increasing, by a time period ΔTon, the time period Ton1 during which the driver circuit 56 causes the NMOS transistor 36 to be on, and supply a current during the time period Ton2, to cancel out the inductor current IL1 swinging to the negative during the time period Tzcd.

Accordingly, the AC-DC converter according to an embodiment of the present disclosure supplies an inductor current IL2 corrected to the positive side to cancel out the current swinging to the negative side.

In the inductor current IL2 in FIG. 6, the time period Ton1 is corrected to the time period Ton2, such that the driver circuit 56 causes the NMOS transistor 36 to be on for a longer time period. This causes the inductor current IL2 to reach, at time t4, a local maximum value ILp2 which is higher than the maximum value ILp1 which would be reached without the correction.

Here, a time period Toff refers to a time period that elapses from when the NMOS transistor 36 is turned off to when the inductor current IL2 reaches 0, in a case where the time period Ton1 is corrected to the time period Ton2.

In response to the driver circuit 56 turning off the NMOS transistor 36 at time t4, the inductor current IL2 reaches 0 at time t5 after a lapse of the time period Toff longer than the time period Toff1.

As a result, a current is supplied as the inductor current IL2 such that the integral of the area in which the inductor current IL2 is of a negative value during the time period Tzcd is canceled out by the integral of the area corresponding to an amount of increase in the inductor current IL2 during the time period of ΔTon and the time period of Toff−Toff1 in the time period during which the inductor current IL2 subsequently is of a positive value.

[Principle 1-1]

When the time period Tzcd is a set value, the AC-DC converter according to an embodiment of the present disclosure derives the time period Ton2 as follows. First, in a case where the on signal Son2 is delayed by the time period Tzcd with respect to the on signal Son1, the value of a decrease in the current is given as follows:

ILnp×(2/π)=(Tzcd/L)×(Vout−Vr)×(2/π2).

Meanwhile, the correction value ΔTon for the time period Ton1 is given as follows:

ΔTon=(2/π)×(L×ILnp)/Vr

∴ΔTon=(2/π2)×Tzcd×[(Vout−Vr)/Vr].

The voltage ratio (Vout−Vr)/Vr is estimated using the time periods Ton2 and Toff as follows:

(Vout−Vr)/Vr=Ton2/Toff.

Thus, the time period Ton2 can be calculated as follows.

First, the voltage ratio (Vout−Vr)/Vr is estimated using the time periods Ton2, Toff.

Ton2/Toff     (1)

Next, the correction value ΔTon is calculated based on the ratio in Expression (1) and the set value Tzcd.

ΔTon=(2/π2)×Tzcd×(Ton2/Toff)     (2)

The corrected time period Ton2 is calculated using the correction value ΔTon in Expression (2).

Ton2=Ton1+ΔTon     (3)

Accordingly, an appropriate time period can be calculated as the time period Ton2.

[Principle 1-2]

Compared with the case of Principle 1-1, when the voltage Vout is an input value, the following estimated value Vres1 estimated from the time periods Ton2, Toff can be used as the rectified voltage Vr.

Vres1=Vout×[Toff/(Ton2+Toff)]     (4)

The voltage ratio based on the voltages Vout and Vres is calculated using the estimated value Vres1 in Expression (4).

(Vout−Vres1)/Vres1     (5)

The correction value ΔTon is calculated based on the ratio in Expression (5) and the set value Tzcd.

ΔTon=(2/π2)×Tzcd×(Vout−Vres1)/Vres1     (6)

The corrected time period Ton2 is calculated using the correction value ΔTon in Expression (6).

$$Ton2 = Ton1 + \Delta Ton \tag{7}$$

Accordingly, an appropriate time period can be calculated as the time period Ton2.

[Principle 1-3]

Compared with the case of Principle 1-2, when the voltages Vout, Vr are input values, the time period Ton2 is calculated as follows. First, the voltage ratio is calculated.

$$(Vout - Vr)/Vr \tag{8}$$

The correction value ΔTon is calculated based on the ratio in Expression (8) and the set value Tzcd.

$$\Delta Ton = (2/\pi^2) \times Tzcd \times (Vout - Vr)/Vr \tag{9}$$

The corrected time period Ton2 is calculated using the correction value ΔTon in Expression (9).

$$Ton2 = Ton1 + \Delta Ton \tag{10}$$

Accordingly, an appropriate time period can be calculated as the time period Ton2.

[Principle 2]

In a case where the AC-DC converter has recorded, as known values, in a storage circuit an inductance L of the inductor 33 and a capacitance C of a capacitor that resonates the inductor current IL1, IL2 together with the inductance L of the inductor 33 (for example, the capacitance of the parasitic capacitor 38), the following value can be used as the time period Tzcd.

$$Tzcd = \pi \times \sqrt{(L \cdot C)} \tag{11}$$

The time period Ton2 can be calculated by using the time period Tzcd in Expression (11) and performing calculations similar to those in Principles 1-1 to 1-3 according to the inputted voltage and/or the like.

According to Principles 1-1 to 1-3, an appropriate time period Ton2 corresponding to the value of the time period Tzcd can be calculated, without the inductance L of the inductor 33 and the capacitance C of the capacitor being recorded as known values. This makes it possible to set an appropriate time period Ton2 corresponding to a decrease in the inductor current IL1.

According to Principle 2, it is possible to set the time period Ton2 corresponding to the resonance period of the resonance of the inductor current IL1 caused by the inductance L of the inductor 33 and the capacitance C of the capacitor that resonates the inductor current IL1 together with the inductance L. This makes it possible to set an appropriate time period Ton2 corresponding to a decrease in the inductor current IL1.

Thus, according to Principles 1-1 to 2, the on time period Ton2 during which the NMOS transistor 36 is on can be corrected, without excess or deficiency, for the amount of a decrease in the inductor current IL2 caused by the delay of the on signal Son1, thereby being able to correct the power factor. Note that the correction of the on time period Ton2 according to an embodiment of the present disclosure can be executed for each cycle from a certain on time period to the next on time period of the NMOS transistor 36.

<<AC-DC Converter 10b According to Example 1>>

Figure 7:
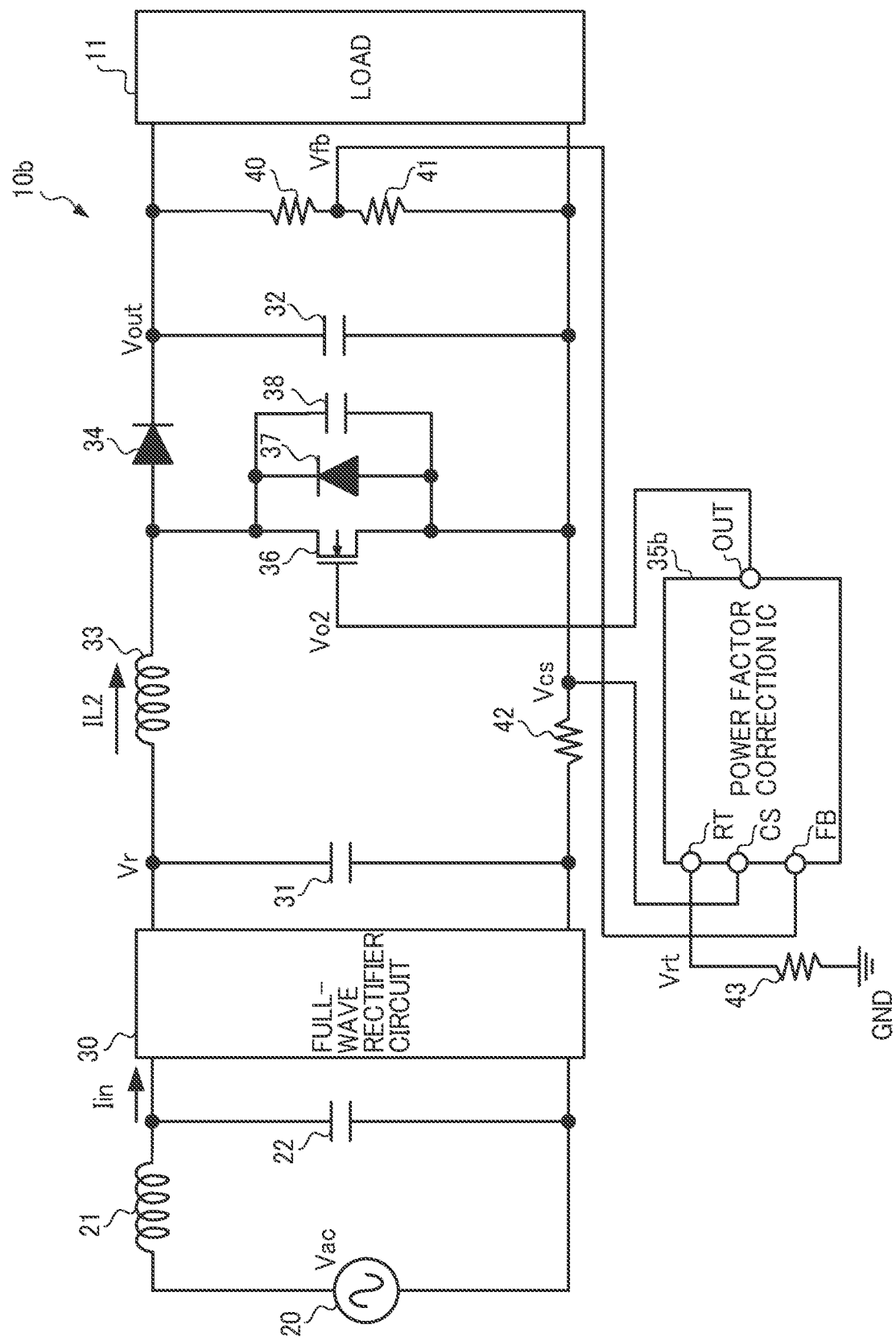
FIG. 7 illustrates an example circuit diagram of an AC-DC converter 10b according to an embodiment.

FIG. 7 illustrates an example configuration of an AC-DC converter 10b according to an embodiment of the present disclosure. Note that components corresponding to those illustrated in the AC-DC converter 10a in FIG. 1 are given the same reference numerals. The following mainly describes differences between the AC-DC converter 10b and the AC-DC converter 10a.

The AC-DC converter 10b includes the full-wave rectifier circuit 30, the capacitors 31, 32, the inductor 33, the diode 34, a power factor correction IC 35b, the NMOS transistor 36, the body diode 37, the parasitic capacitor 38, and resistors 40 to 43. In other words, the AC-DC converter 10b is different from the AC-DC converter 10a in including the power factor correction IC 35b and the resistor 43.

Further, the power factor correction IC 35b has a terminal RT in addition to the terminals CS, FB, OUT.

The resistor 43 has one end coupled to the terminal RT, and the other end grounded. A voltage Vrt generated across the resistor 43 is applied to the terminal RT.

As will be described with reference to FIGS. 8 and 9, the power factor correction IC 35b sets the delay time period Tzcd based on the voltage Vrt at the terminal RT. Additionally, the power factor correction IC 35b appropriately sets the on time period of the NMOS transistor 36 based on the delay time period Tzcd.

In other words, the power factor correction IC 35b is different from the power factor correction IC 35a in the time period during which a voltage Vo2, which is applied to the NMOS transistor 36 via the terminal OUT, is at a high logic level. Accordingly, even if the delay time period Tzcd is set such that there is a time period during which the inductor current IL2 is of a negative value, the power factor correction IC 35b can correct the on time period during which the NMOS transistor 36 is on, thereby being able to correct a time period during which the inductor current IL2 is of a positive value. As a result, the power factor can be corrected.

The terminal RT corresponds to a "first terminal," and the voltage Vrt corresponds to a "second voltage."

<<Power Factor Correction IC 35b According to Example 1>>

Figure 8:
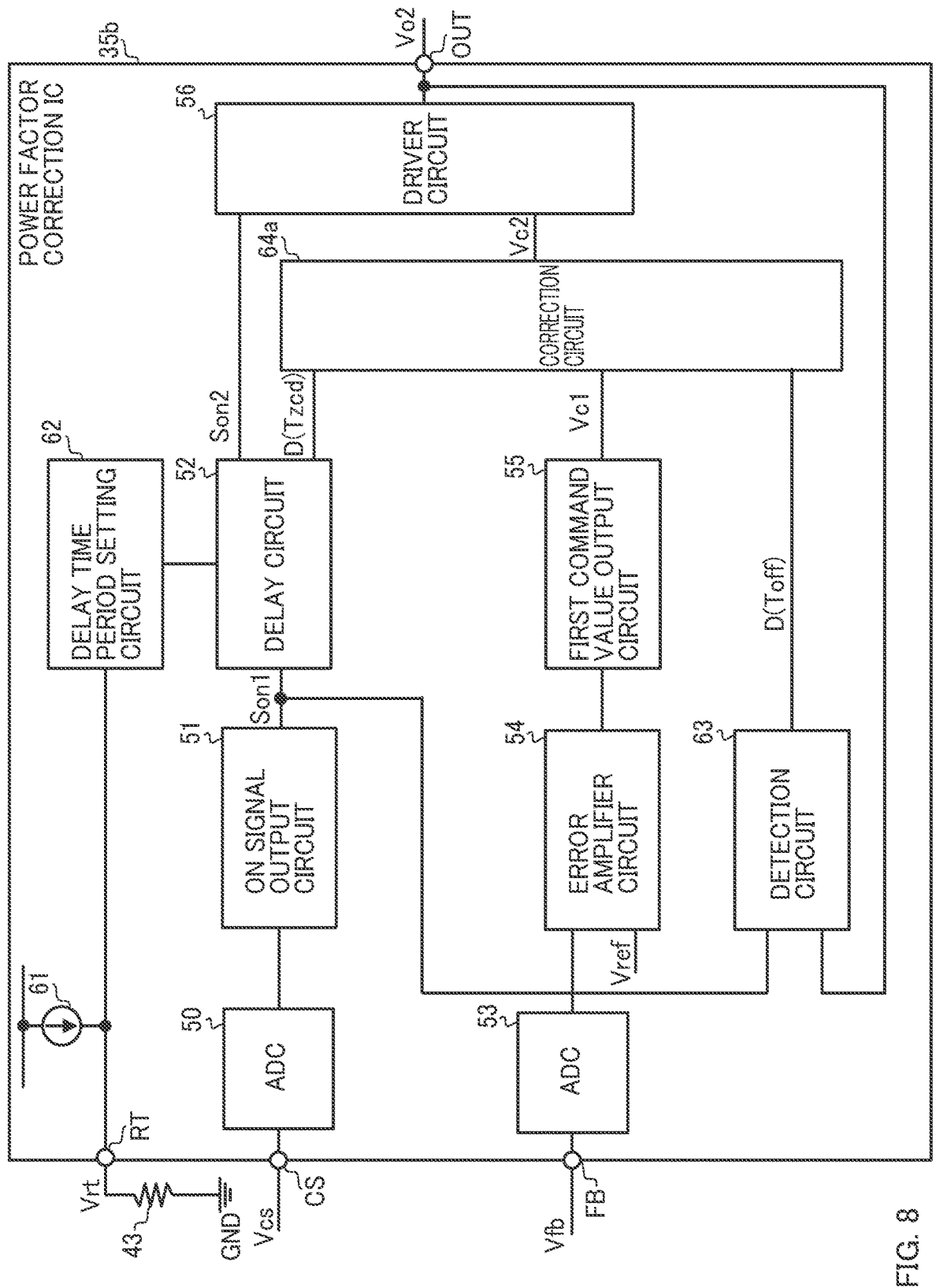
FIG. 8 illustrates an example configuration of a power factor correction IC 35b.

FIG. 8 illustrates an example configuration of the power factor correction IC 35b. Note that components corresponding to those illustrated in the power factor correction IC 35a in FIG. 2 are given the same reference numerals. The following mainly describes differences in configuration between the power factor correction IC 35b and the power factor correction IC 35a.

The power factor correction IC 35b includes the ADCs 50, 53, the on signal output circuit 51, the delay circuit 52, the error amplifier circuit 54, the first command value output circuit 55, the driver circuit 56, a current source 61, a delay time period setting circuit 62, a detection circuit 63, a correction circuit 64a, and the terminals CS, FB, OUT, RT. In other words, the power factor correction IC 35b has the terminal RT, the current source 61, the delay time period setting circuit 62, the detection circuit 63, and the correction circuit 64a, in addition to the configuration of the power factor correction IC 35a.

In an embodiment of the present disclosure, the on signal output circuit 51 outputs the on signal Son1 not only to the delay circuit 52 but also to the detection circuit 63.

The delay circuit 52 not only outputs the on signal Son2, which has been delayed, to the driver circuit 56, but also outputs data D(Tzcd) on the time period Tzcd to the correction circuit 64a.

The driver circuit 56 turns on the NMOS transistor 36 in response to the on signal Son2, which has been delayed, and keeps the NMOS transistor 36 on for the time period Ton2 which is based on a second command value Vc2, which will be described later. Thereafter, the driver circuit 56 turns off the NMOS transistor 36.

The driver circuit 56 according to an embodiment of the present disclosure supplies the voltage Vo2 not only to the gate electrode of the NMOS transistor 36 but also to the detection circuit 63. As will be described later, the voltage Vo2 is used by the detection circuit 63 to detect, based on the voltage Vo2, a time period Toff that elapses from when the NMOS transistor 36 is turned off to when the inductor current IL2 reaches 0.

==Current Source 61 and Delay Time Period Setting Circuit 62 (Setting Delay Time Period)==

The current source 61 is a bias current source that supplies a predetermined current to the terminal RT. By virtue of the current supplied from the current source 61, the voltage Vrt which is proportional to the current is generated across the resistor 43. Accordingly, the voltage Vrt proportional to the current is applied to the terminal RT.

The delay time period setting circuit 62 sets a predetermined time period Tzcd to the delay circuit 52, based on the voltage Vrt applied to the terminal RT. In other words, in an embodiment of the present disclosure, the time period Tzcd is a time period determined based on the voltage Vrt applied to the terminal RT in proportion to the resistance of the resistor 43.

Conversely, the voltage Vrt corresponding to the predetermined time period Tzcd is applied to the terminal RT.

==Detection Circuit 63 and Correction Circuit 64a (Output of Second Command Value Vc2)==

The detection circuit 63 detects a timing at which the NMOS transistor 36 is turned off, based on the voltage Vo2 supplied from the driver circuit 56. The detection circuit 63 also detects, based on the on signal Son1, a timing at which the inductor current IL2 reaches 0 after turning off of the NMOS transistor 36.

Based on the timing at which the NMOS transistor 36 is turned off and the timing at which the inductor current IL2 reaches 0, the detection circuit 63 detects the time period Toff elapsing from when the NMOS transistor 36 is turned off to when the inductor current IL2 reaches 0. Further, the detection circuit 63 outputs data D(Toff) on the time period Toff to the correction circuit 64a.

The correction circuit 64a performs correction based on Principle 1-1. In other words, the correction circuit 64a corrects the first command value Vc1, and outputs a resultant value as the second command value Vc2 to turn on the NMOS transistor 36 for the time period Ton2, which is longer than the time period Ton1 corresponding to the first command value.

Specifically, the correction circuit 64a corrects the first command value Vc1 based on the data D(Tzcd) on the time period Tzcd, the first command value Vc1, and the data D(Toff) on the off time period, and outputs a resultant value as the second command value Vc2.

Additionally, the correction circuit 64a according to an embodiment of the present disclosure corrects the first command value Vc1, based on the time period Tzcd and the ratio of the time period Ton2, which is based on the second command value Vc2, to the time period Toff, which is from when the NMOS transistor 36 turns off to when the inductor current reaches 0.

The time period Ton2 corresponds to a "second time period," and the time period Toff corresponds to a "third time period."

The timing at which the NMOS transistor 36 is turned off corresponds to a "first timing," and the timing at which the inductor current IL2 reaches 0 after turning off of the NMOS transistor 36 corresponds to a "second timing."

===Details of Correction Circuit 64a===

The following describes more details of the configuration and operation of the correction circuit 64a. The correction circuit 64a implements the correction with respect to the time period Ton2 according to Principle 1-1.

Figure 9:
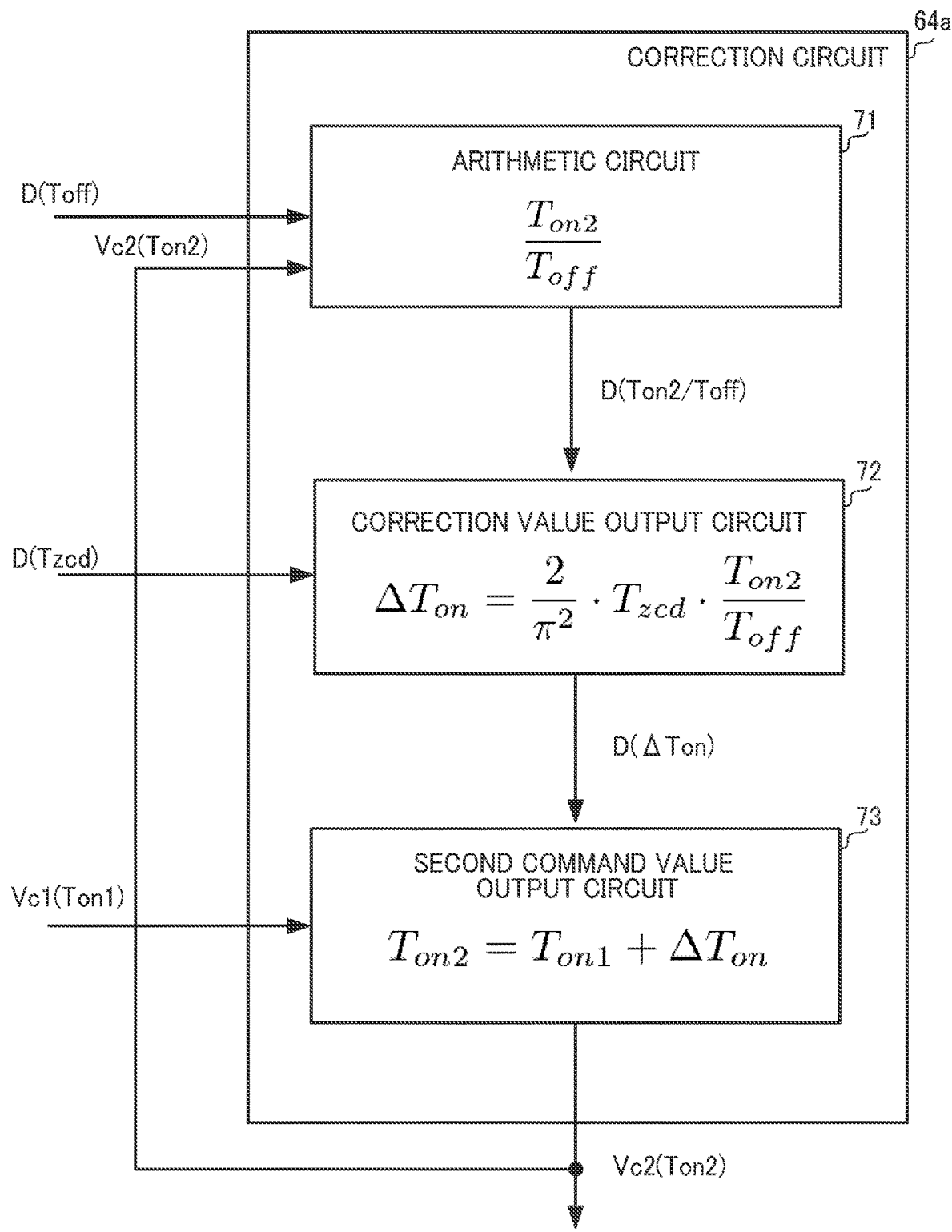

FIG. 9 illustrates an example configuration of the correction circuit 64a. The correction circuit 64a includes an arithmetic circuit 71, a correction value output circuit 72, and a second command value output circuit 73.

The arithmetic circuit 71 calculates a ratio by dividing the time period Ton2 by the time period Toff, based on the data D(Toff) on the time period Toff received from the detection circuit 63 and the second command value Vc2 received from the second command value output circuit 73. Specifically, the arithmetic circuit 71 calculates the ratio given by Expression (1).

$$\text{Ton2/Toff} \tag{1}$$

The arithmetic circuit 71 outputs data D(Ton2/Toff) which is based on the ratio given by Expression (1), to the correction value output circuit 72.

The correction value output circuit 72 calculates the correction value ΔTon given by Expression (2), based on the data D(Tzcd) on the time period Tzcd, the data D(Ton2/Toff), and a constant (2/π2) stored in the correction value output circuit 72. Specifically, the correction value output circuit 72 calculates the correction value ΔTon for the time period Ton1 by multiplying the constant (2/π2), the time period Tzcd, and the ratio Ton2/Toff together.

$$\Delta\text{Ton}=(2/\pi2)\times\text{Tzcd}\times(\text{Ton2/Toff}) \tag{2}$$

Further, the correction value output circuit 72 outputs data D(ΔTon) on the correction value ΔTon, to the second command value output circuit 73.

The second command value output circuit 73 calculates the time period Ton2 given by Expression (3). Specifically, based on the correction value ΔTon and the first command value Vc1 corresponding to the time period Ton1, the second command value output circuit 73 calculates the time period Ton2 by correcting the time period Ton1 using the correction value ΔTon.

$$\text{Ton2}=\text{Ton1}+\Delta\text{Ton} \tag{3}$$

Further, the second command value output circuit 73 outputs the second command value Vc2 corresponding to the time period Ton2, to the driver circuit 56. The second command value output circuit 73 outputs the second command value Vc2 to the arithmetic circuit 71 as well. This makes it possible for the second command value output circuit 73 to set an appropriate time period Ton2 in the driver circuit 56.

Note that the arithmetic circuit 71 corresponds to an "arithmetic circuit."

<<Main Waveforms in AC-DC Converter According to Example>>

Figure 10:
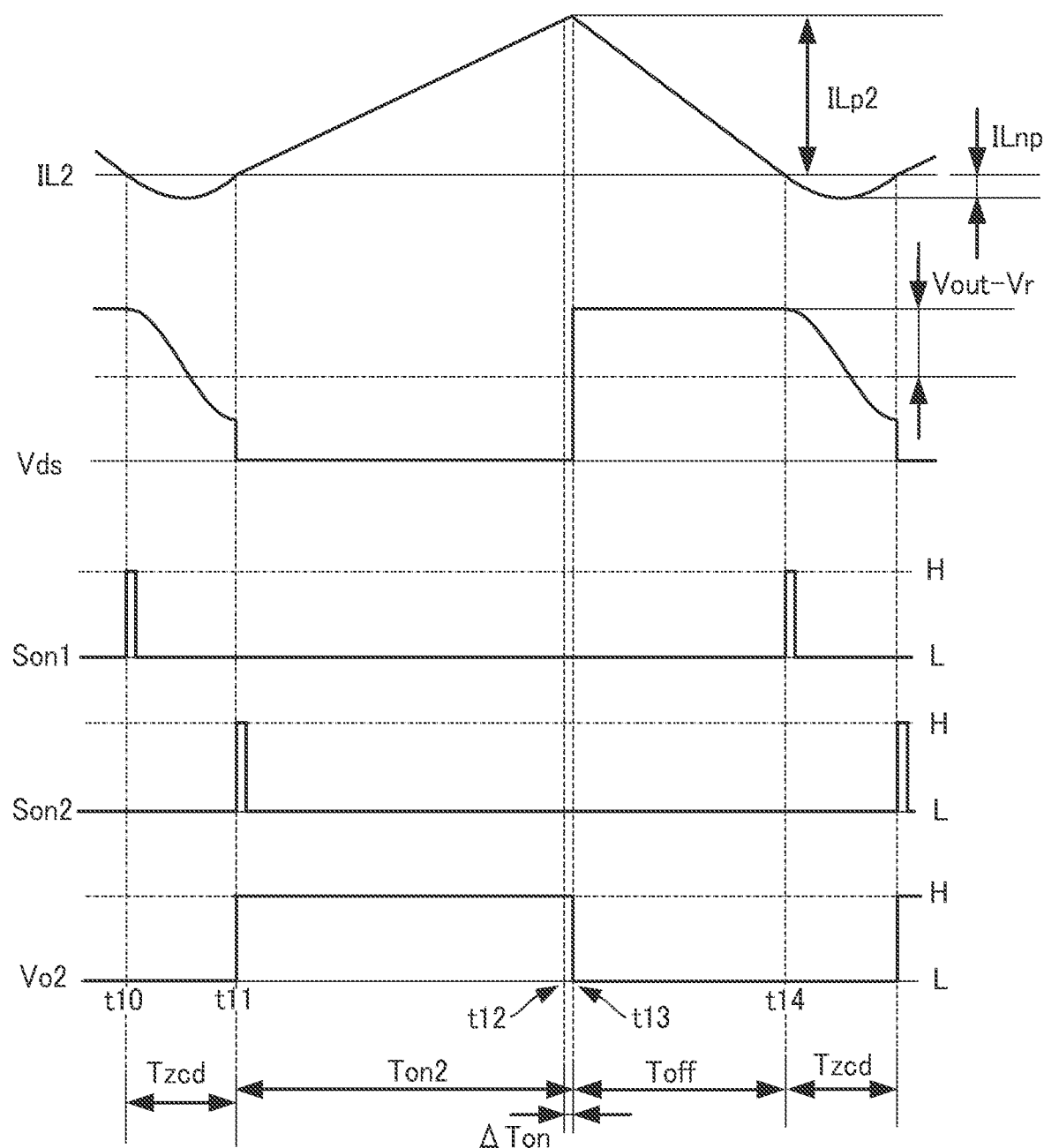
FIG. 10 is a conceptual diagram illustrating the relations among an inductor current IL2, a drain-source voltage Vds of an NMOS transistor 36, and a voltage Vo2.

The main waveforms in the AC-DC converter 10b will be described here, to explain an overview of the operation of the AC-DC converter 10b of the example. FIG. 10 is a conceptual diagram illustrating the relations among the inductor current IL2, the drain-source voltage Vds of the NMOS transistor 36, and the voltage Vo2.

The following description will be given assuming that the inductor current IL2 has decreased to 0 at time t10 after turning off of the NMOS transistor 36, which corresponds to FIG. 3.

In response to the inductor current IL2 decreasing to 0 at time t10, the on signal output circuit 51 in FIG. 8 outputs the high on signal Son1. From time t10, the inductor current IL2 further decreases, resulting in a negative value.

In response to the inductor current IL2 in the positive direction decreasing to 0 at time t10 after turning off of the NMOS transistor 36, resonance occurs at the inductor 33 and the parasitic capacitor 38. As a result, the drain-source voltage Vds of the NMOS transistor 36 decreases, and an inductor current IL2 of a negative value flows.

At time t11 at which the delay time period Tzcd has elapsed since time t10, the driver circuit 56 outputs the high voltage Vo2 in response to the on signal Son2 which has been delayed. Accordingly, the NMOS transistor 36 is turned on.

When the NMOS transistor 36 is turned on in response to the high on signal Son2, the inductor current IL2 flowing through the inductor 33 increases.

Then, based on the second command value Vc2 obtained by the correction circuit 64a by correcting the first command value Vc1, the driver circuit 56 keeps the NMOS transistor 36 on until time t13 at which the time period Ton2=Ton1+ΔTon has elapsed since time t11.

Note that FIG. 10 also gives time t12 at which the time period Ton1 has elapsed since time t11, in order to explicitly indicate the time period ΔTon. The inductor current IL2 reaches the local maximum value ILp2 at time t13.

At time t13, the driver circuit 56 outputs the low voltage Vo2. Accordingly, the NMOS transistor 36 is turned off.

Then, at time t14, the inductor current IL2 decreases to 0 again. Here, the time period Toff has elapsed from time t13 to time t14, in other words, from when the NMOS transistor 36 is turned off to when the inductor current IL2 reaches 0. At time t14, the on signal output circuit 51 outputs the high signal Son1 again.

As has been described above, in the AC-DC converter 10b according to an embodiment of the present disclosure, the NMOS transistor 36 is on during a time period from time t11 to time t13. This time period is longer, by the time period of ΔTon, than the time period during which the NMOS transistor 36 is on in the AC-DC converter 10a in FIG. 3.

As such, in the AC-DC converter 10b according to an embodiment of the present disclosure, the NMOS transistor 36 is on for a time period that is longer by the time period corresponding to ΔTon, and thus a positive current that cancels out the contribution of a negative current value of the inductor current IL2 flows for a time period that is longer by the time period of ΔTon+(Toff−Toff1). This consequently reduces the time period during which the current Iin indicates 0, to thereby eliminate the dead angle.

This results in resolving the distortion of the waveform of the current Iin with respect to a sine waveform, to thereby correct the power factor.

<<Power Factor Correction IC 35c According to Example 2>>

Figure 11:
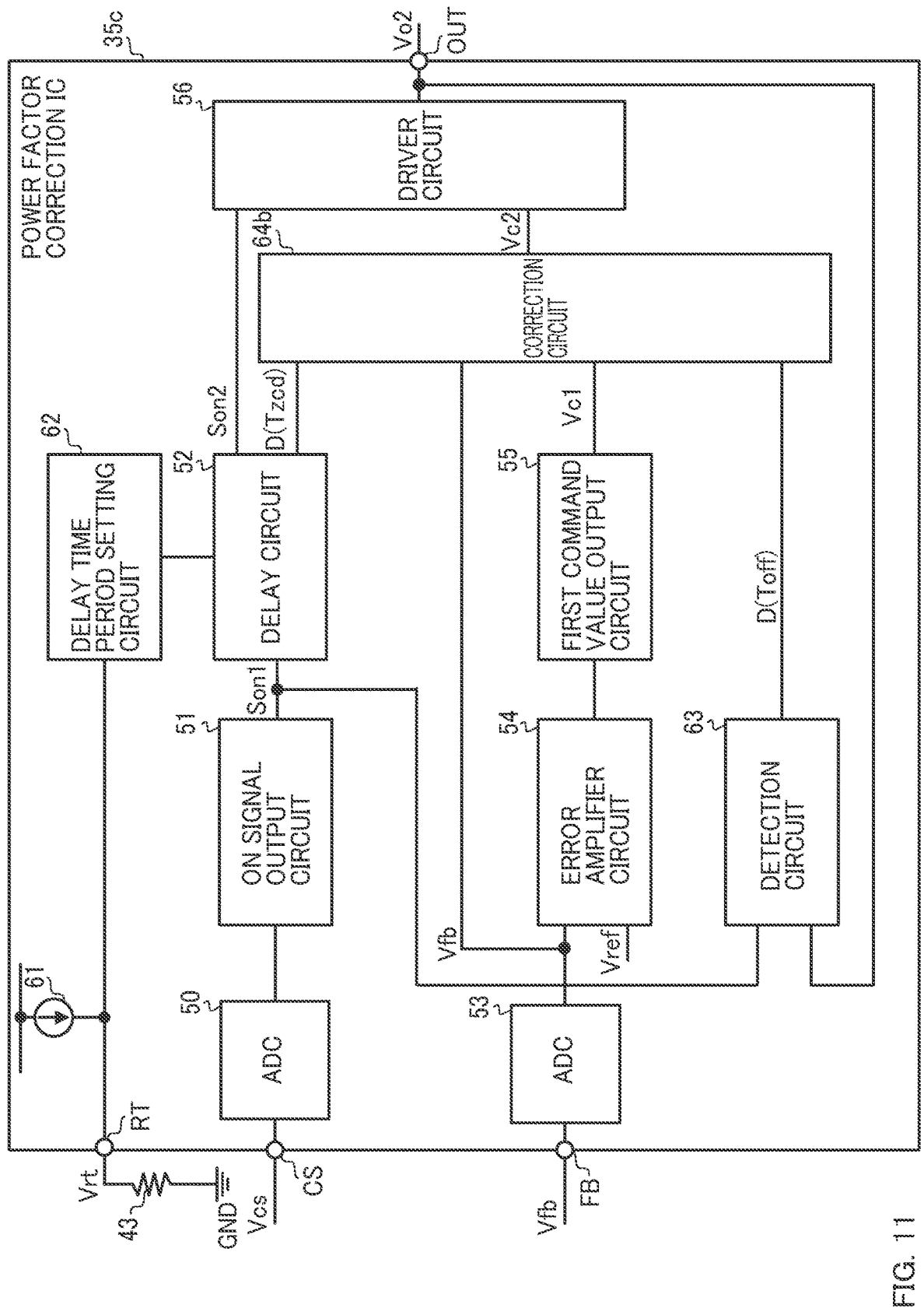
FIG. 11 illustrates an example configuration of a power factor correction IC 35c.

FIG. 11 illustrates a power factor correction IC 35c. The following mainly describes differences in configuration between the power factor correction IC 35c and the power factor correction IC 35a. The power factor correction IC 35c includes a correction circuit 64b.

The AC-DC converter including the power factor correction IC 35c is different in configuration from the AC-DC converter 10b in FIG. 7 in including the power factor correction IC 35c in place of the power factor correction IC 35b, and is the same in other configurations as the AC-DC converter 10b. Accordingly, the diagram of the AC-DC converter is omitted.

The ADC 53 according to an embodiment of the present disclosure inputs, to the correction circuit 64b, a value obtained by converting the voltage Vfb into a digital value.

The correction circuit 64b according to an embodiment of the present disclosure derives the second command value Vc2 using the voltage Vfb as an input value.

===Details of Correction Circuit 64b===

The following describes the details of the calculation performed by the correction circuit 64b. The correction circuit 64b implements the correction with respect to the time period Ton2 according to Principle 1-2.

Figure 12:
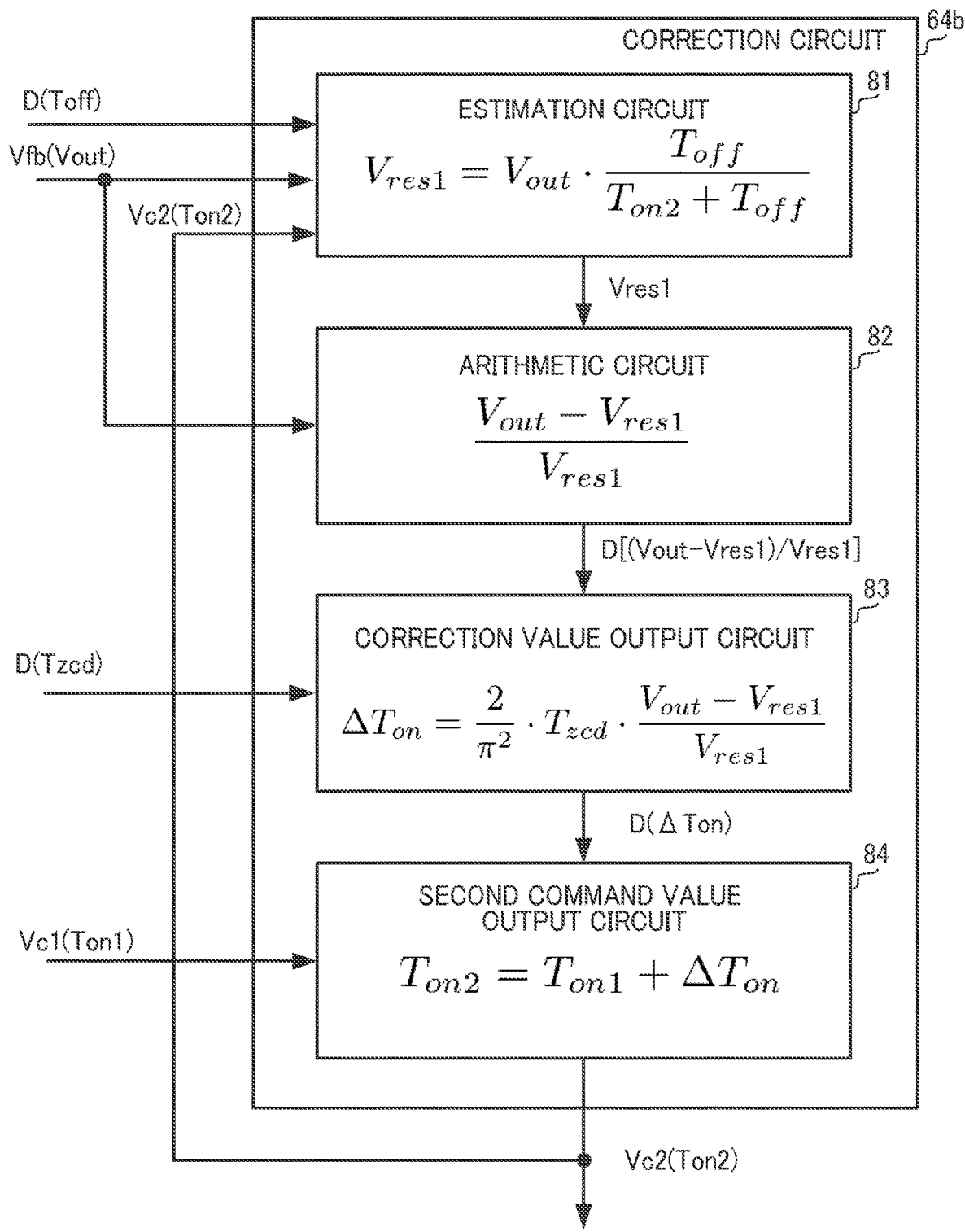
FIG. 12 illustrates an example configuration of a correction circuit 64b.

FIG. 12 illustrates an example configuration of the correction circuit 64b. The correction circuit 64b includes an estimation circuit 81, an arithmetic circuit 82, a correction value output circuit 83, and a second command value output circuit 84.

The estimation circuit 81 calculates an estimated value Vres1 of the rectified voltage Vr given by Expression (4). Specifically, the estimation circuit 81 calculates the estimated value Vres1 of the rectified voltage Vr, based on the data D(Toff) on the time period Toff, the second command value Vc2, and the voltage Vfb corresponding to the voltage Vout.

$$Vres1 = Vout \times [Toff/(Ton2+Toff)] \quad (4)$$

The estimation circuit 81 then outputs the estimated value Vres1 which is based on the ratio given by Expression (4), to the arithmetic circuit 82.

The arithmetic circuit 82 calculates a voltage ratio given by Expression (5). Specifically, the arithmetic circuit 82 calculates a voltage ratio that is based on the voltage Vout and the estimated value Vres1, based on the voltage Vfb corresponding to the voltage Vout and the estimated value Vres1.

$$(Vout-Vres1)/Vres1 \quad (5)$$

The arithmetic circuit 82 then outputs data D[(Vout−Vres1)/Vres1] on the voltage ratio, to the correction value output circuit 83.

The correction value output circuit 83 calculates the correction value ΔTon given by Expression (6), based on the data D(Tzcd) on the time period Tzcd, the data D[(Vout−Vres1)/Vres1], and the constant $(2/\pi^2)$ stored in the correction value output circuit 83. Specifically, the correction value output circuit 83 calculates the correction value ΔTon for the time period Ton1 by multiplying the constant $(2/\pi^2)$, the time period Tzcd, and the ratio (Vout−Vres1)/Vres1, together.

$$\Delta Ton = (2/\pi^2) \times Tzcd \times (Vout-Vres1)/Vres1 \quad (6)$$

The correction value output circuit 83 then outputs data D(ΔTon) on the correction value ΔTon, to the second command value output circuit 84.

The second command value output circuit 84 calculates the time period Ton2 given by Expression (7). Specifically, based on the correction value ΔTon and the first command value Vc1 corresponding to the time period Ton1, the second command value output circuit 84 calculates the time period Ton2 by correcting the time period Ton1 using the correction value ΔTon.

$$Ton2 = Ton1 + \Delta Ton \quad (7)$$

Further, the second command value output circuit 84 outputs the second command value Vc2 corresponding to the time period Ton2, to the driver circuit 56.

As has been described above, the correction circuit 64b also can output the second command value Vc2 obtained by correcting the time period Ton1. Accordingly, the power factor correction IC 35c also can obtain the waveform of the inductor current IL2 similar to that in FIG. 10.

Note that the arithmetic circuit 82 corresponds to an "arithmetic circuit."

<<AC-DC Converter 10c According to Example 3>>

Figure 13:
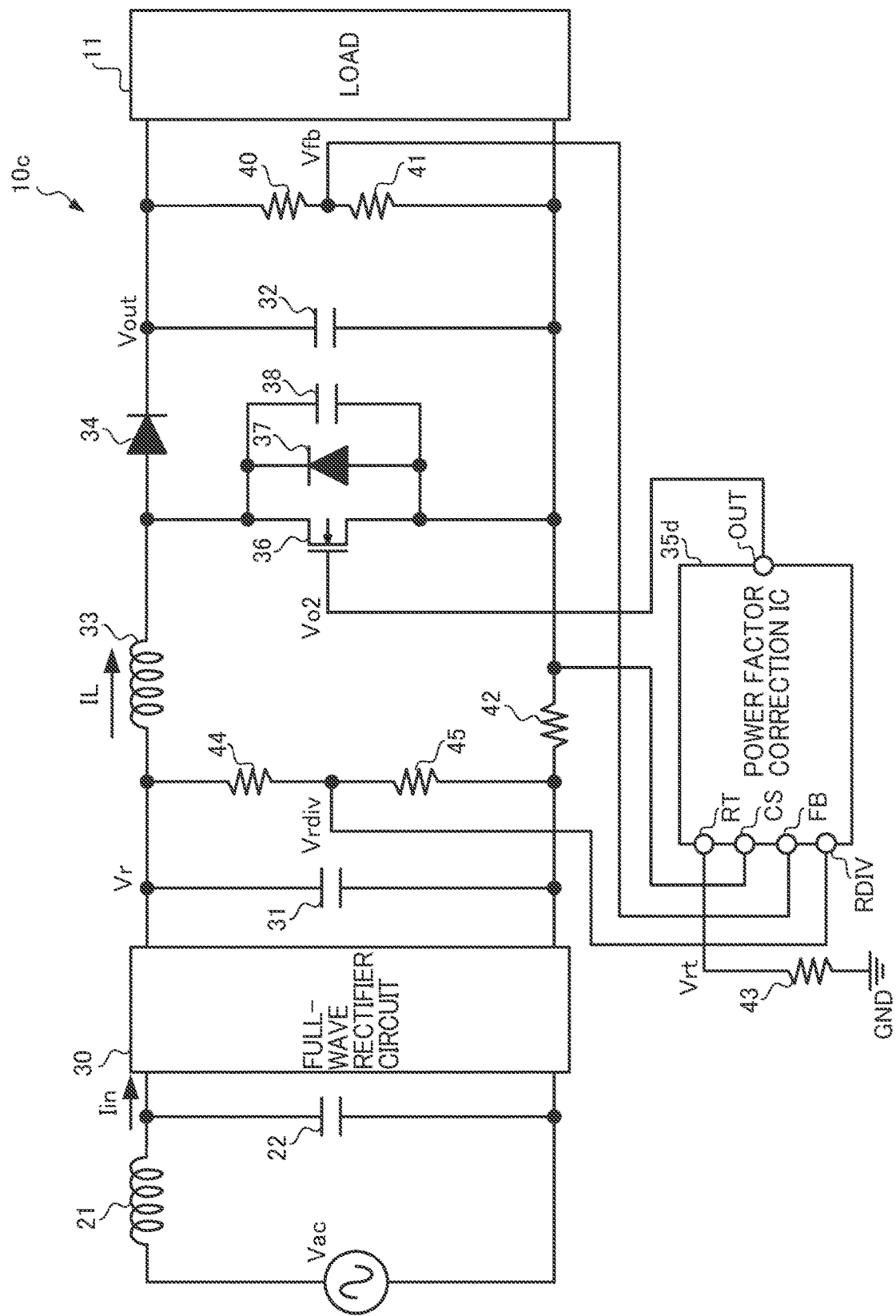
FIG. 13 illustrates an example circuit diagram of an AC-DC converter 10c according to an embodiment.

FIG. 13 illustrates an example circuit diagram of an AC-DC converter 10c according to an embodiment of the present disclosure. Note that components corresponding to those illustrated in the AC-DC converter 10b in FIG. 7 are given the same reference numerals. The following mainly describes the differences between the AC-DC converter 10c and the AC-DC converter 10b.

The AC-DC converter 10c includes a power factor correction IC 35d and resistors 44, 45 in addition to the configuration of the AC-DC converter 10b. Further, the power factor correction IC 35d has a terminal RDIV in addition to the terminals CS, FB, OUT, RT of the power factor correction IC 35b, 35c.

The resistor 44 has one end coupled to a node between the capacitor 31 and the inductor 33, and the other end coupled to the resistor 45. The resistors 44, 45 configure a voltage divider circuit that divides the rectified voltage Vr.

A node between the resistors 44 and 45 is coupled to the terminal RDIV. A voltage Vrdiv obtained by dividing the rectified voltage Vr is applied to the terminal RDIV.

The terminal RDIV corresponds to a "second terminal," and the voltage Vrdiv corresponds to a "third voltage."

<<Power Factor Correction IC 35d According to Example 3>>

Figure 14:
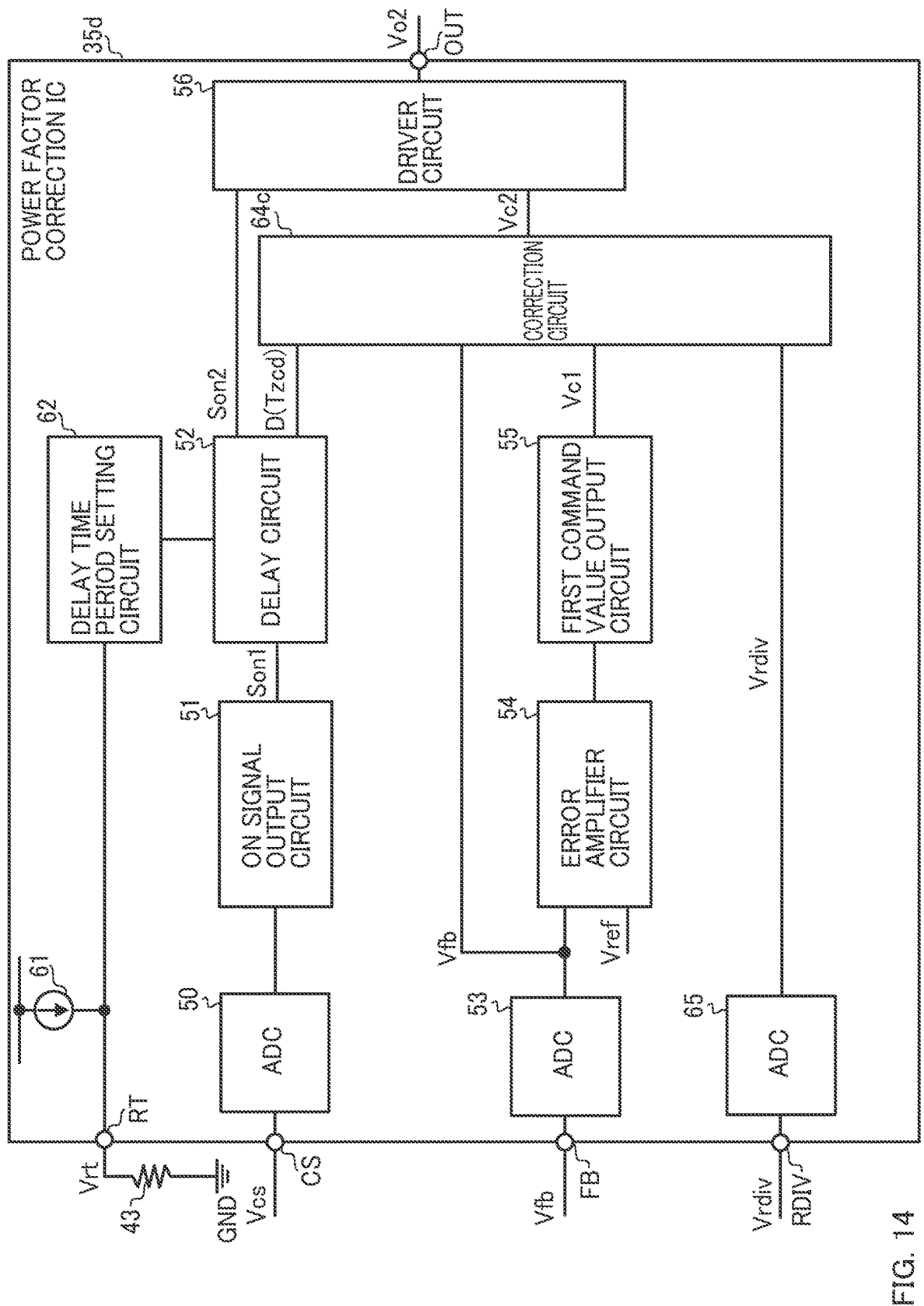
FIG. 14 illustrates an example configuration of a power factor correction IC 35d.

FIG. 14 illustrates an example configuration of the power factor correction IC 35d. The power factor correction IC 35d includes a correction circuit 64c and an ADC 65.

The ADC 65 converts the voltage Vrdiv, which corresponds to the rectified voltage Vr and is applied to the terminal RDIV, into a digital value. In the following description, the digital value outputted from the ADC 65 is referred to as voltage Vrdiv, for convenience. The ADC 65 inputs the digital value Vrdiv to the correction circuit 64c.

===Details of the Correction Circuit 64c===

The following describes details of the configuration of the correction circuit 64c. The correction circuit 64c implements the correction with respect to the time period Ton2 according to Principle 1-3.

Figure 15:
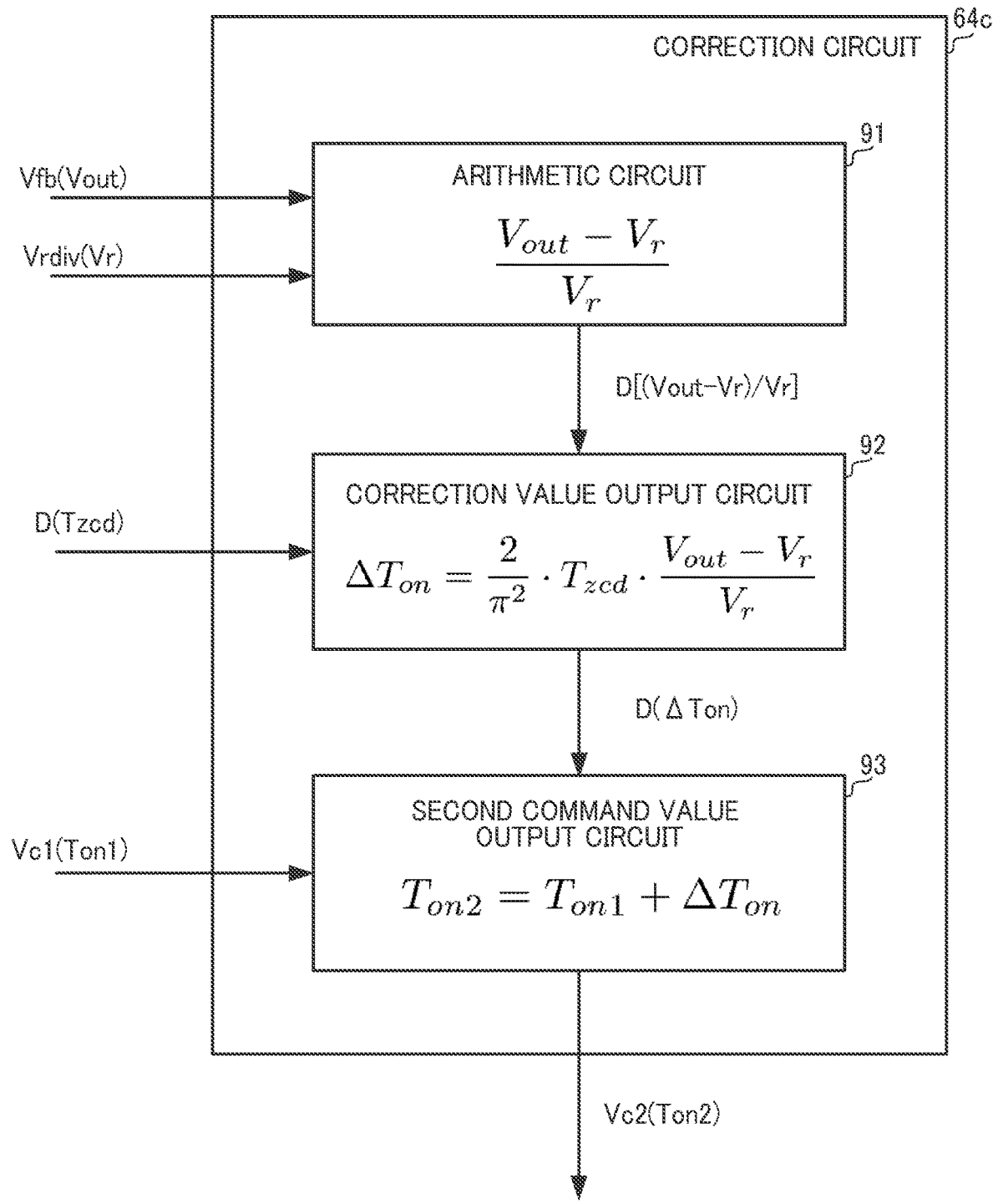
FIG. 15 illustrates an example configuration of a correction circuit 64c.

FIG. 15 illustrates an example configuration of the correction circuit 64c. The correction circuit 64c includes an arithmetic circuit 91, a correction value output circuit 92, and a second command value output circuit 93.

The arithmetic circuit 91 calculates a ratio given by Expression (8). Specifically, the arithmetic circuit 91 calculates a voltage ratio, based on the voltage Vfb corresponding to the voltage Vout and the voltage Vrdiv corresponding to the voltage Vr.

$$(\text{Vout}-\text{Vr})/\text{Vr} \qquad (8)$$

The arithmetic circuit 91 then outputs data D[(Vout−Vr)/Vr] on the voltage ratio, to the correction value output circuit 92.

The correction value output circuit 92 calculates the correction value ΔTon given by Expression (9), based on the data D(Tzcd) on the time period Tzcd, the data D[(Vout−Vr)/Vr], and the constant (2/π2) stored in the correction value output circuit 72. Specifically, the correction value output circuit 92 calculates the correction value ΔTon for the time period Ton1 by multiplying the constant (2/π2), the time period Tzcd, and the ratio (Vout−Vr)/Vr together.

$$\Delta\text{Ton}=(2/\pi 2)\times\text{Tzcd}\times(\text{Vout}-\text{Vr})/\text{Vr} \qquad (9)$$

The correction value output circuit 92 then outputs the data D(ΔTon) on the correction value ΔTon, to the second command value output circuit 93.

The second command value output circuit 93 calculates the time period Ton2 given by Expression (10). Specifically, the second command value output circuit 93 calculates the time period Ton2 by correcting the time period Ton1 using the correction value ΔTon, based on the first command value Vc1, which corresponds to the time period Ton1 and has been received from the first command value output circuit 55, and the correction value ΔTon received from the correction value output circuit 92.

$$\text{Ton2}=\text{Ton1}+\Delta\text{Ton} \qquad (10)$$

The second command value output circuit 93 then outputs the second command value Vc2 corresponding to the time period Ton2, to the driver circuit 56.

As has been described above, the correction circuit 64c also can output the second command value Vc2 obtained by correcting the time period Ton1. Accordingly, the power factor correction IC 35d also can obtain the waveform of the inductor current IL2 similar to that in FIG. 10.

Note that the arithmetic circuit 91 corresponds to an "arithmetic circuit."

<<Power Factor Correction IC 35e According to Example 4>>

Figure 16:
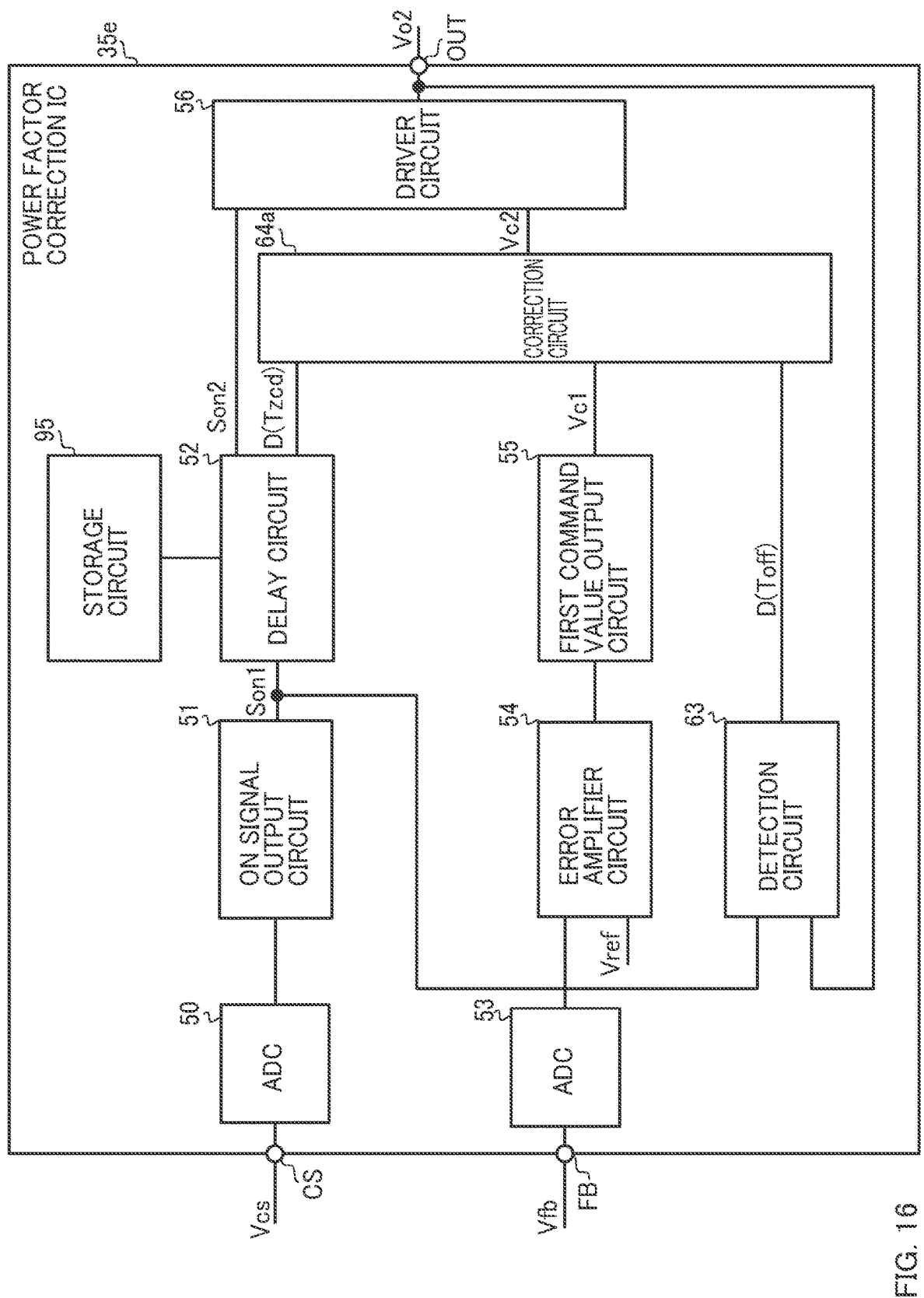
FIG. 16 illustrates an example configuration of a power factor correction IC 35e.

FIG. 16 illustrates an example configuration of a power factor correction IC 35e. The power factor correction IC 35e includes a storage circuit 95.

The power factor correction IC 35e has the same configuration as the power factor correction IC 35b, except that the storage circuit 95 is included and the terminal RT, the current source 61, and the delay time period setting circuit 62 are not included. Note that the resistor 43 is coupled to the terminal RT of the power factor correction IC 35b, however since the power factor correction IC 35e does not have the terminal RT, the AC-DC converter including the power factor correction IC 35e does not include the resistor 43 either.

The storage circuit 95 has recorded therein the time period Tzcd which is based on the inductance L of the inductor 33 and the capacitance C of a capacitor that resonates the inductor current IL2 together with the inductance L (for example, the capacitance of the parasitic capacitor 38). The storage circuit 95 has recorded therein the time period Tzcd that satisfies Expression (11) below, based on the inductance L and the capacitance C.

$$\text{Tzcd}=\pi\times\sqrt{(L\cdot C)} \qquad (11)$$

The delay circuit 52 delays the on signal Son1 based on the time period Tzcd of Expression (11), and outputs a resultant signal as the on signal Son2. In an embodiment of the present disclosure, the correction by the correction circuit 64a is also executed based on the data D(Tzcd) on the time period Tzcd, through the same process as that already described with reference to FIG. 9. The power factor correction IC 35e thus can execute the correction with respect to the time period Ton2 described in Principle 2 in FIG. 6.

In an embodiment of the present disclosure, the storage circuit 95 is provided inside the power factor correction IC 35e, and the delay circuit 52 is coupled to the storage circuit 95.

Alternatively, the storage circuit 95 may be a storage device provided outside the power factor correction IC 35e. In this case, the delay circuit 52 is coupled to an external coupling terminal (not illustrated) of the power factor correction IC 35e. The external coupling terminal (not illustrated) is coupled to the storage device provided outside the power factor correction IC 35e.

Note that the storage circuit 95 corresponds to a "first storage circuit."

<<Power Factor Correction IC 35f According to Example 5>>

Figure 17:
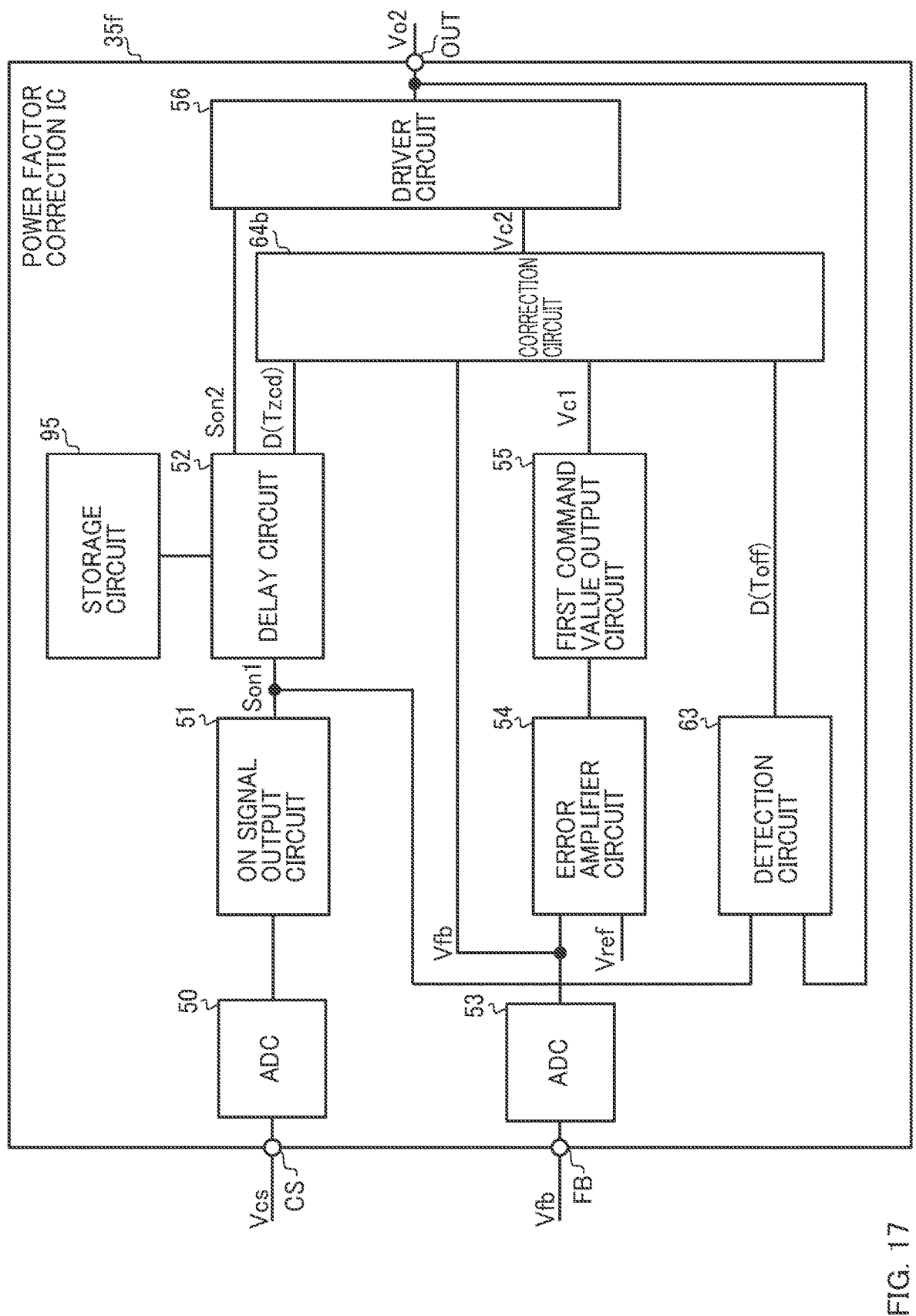
FIG. 17 illustrates an example configuration of a power factor correction IC 35f.

FIG. 17 illustrates an example configuration of a power factor correction IC 35f. The power factor correction IC 35f includes the storage circuit 95.

The power factor correction IC 35f has the same configuration as the power factor correction IC 35c, except that the storage circuit 95 is included and the terminal RT, the current source 61, and the delay time period setting circuit 62 are not included. The AC-DC converter including the power factor correction IC 35f does not include the resistor 43 either.

The storage circuit 95 sets the time period Tzcd that satisfies Expression (11), to the delay circuit 52.

$$Tzcd = \pi \times \sqrt{(L \cdot C)} \quad (11)$$

The delay circuit 52 outputs the on signal Son2 using the time period Tzcd of Expression (11), and outputs the data D(Tzcd) to the correction circuit 64b. The correction circuit 64b outputs the second command value Vc2, based on this D(Tzcd), through the same process as that described with FIG. 11. Accordingly, the power factor correction IC 35f can execute the correction with respect to the time period Ton2 described in Principle 2 in FIG. 6.

The storage circuit 95 is provided inside the power factor correction IC 35f according to an embodiment of the present disclosure, but may alternatively be a storage device provided outside the power factor correction IC 35f.

<<Power Factor Correction IC 35g According to Example 6>>

Figure 18:
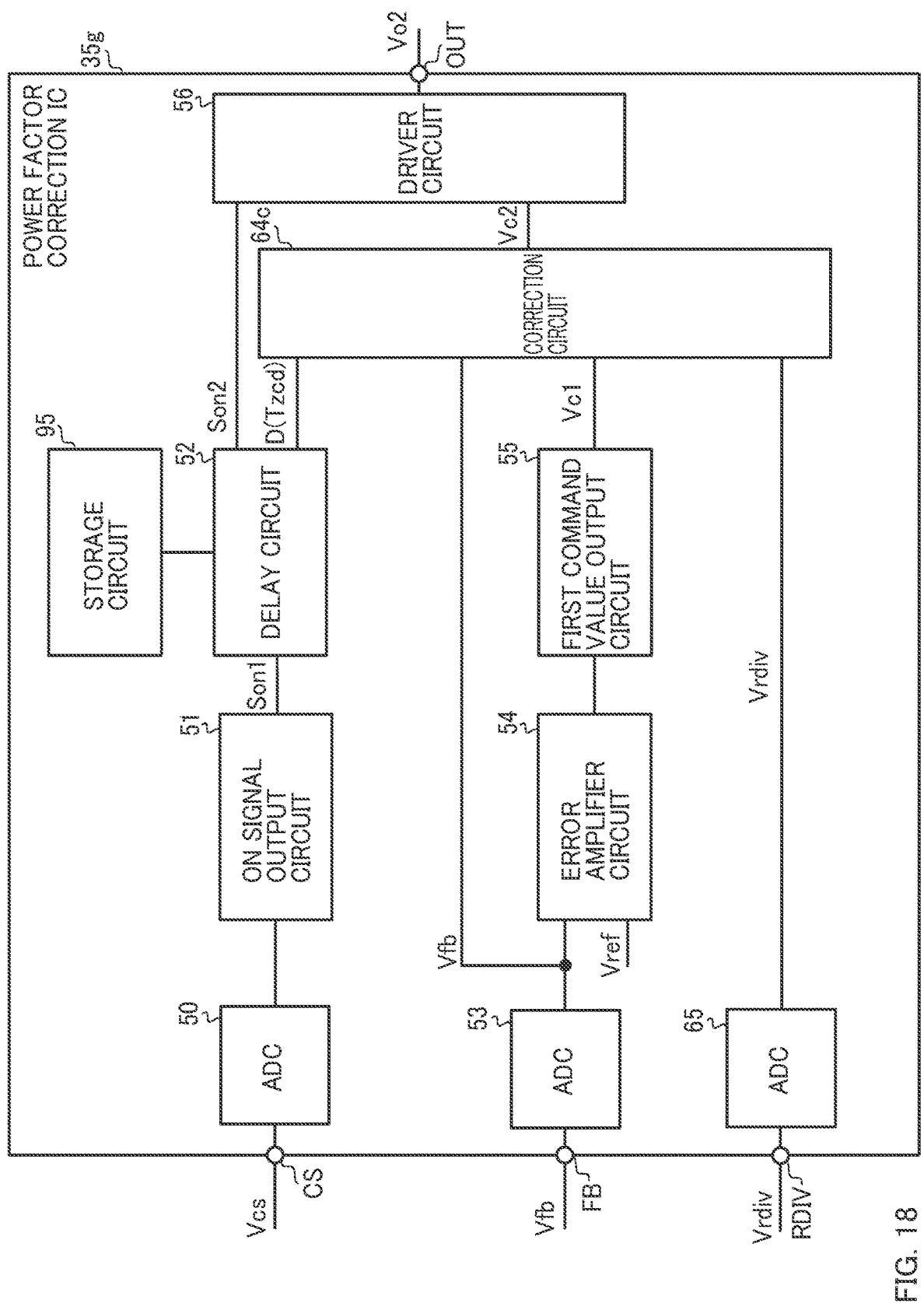
FIG. 18 illustrates an example configuration of a power factor correction IC 35g.

FIG. 18 illustrates an example configuration of a power factor correction IC 35g. The power factor correction IC 35g includes the storage circuit 95.

The power factor correction IC 35g has the same configuration as the power factor correction IC 35d, except that the storage circuit 95 is included and the terminal RT, the current source 61, and the delay time period setting circuit 62 are not included. The AC-DC converter including the power factor correction IC 35g does not include the resistor 43 either.

The storage circuit 95 sets the time period Tzcd that satisfies Expression (11), to the delay circuit 52.

$$Tzcd = \pi \times \sqrt{(L \cdot C)} \quad (11)$$

The delay circuit 52 outputs the on signal Son2 using the time period Tzcd of Expression (11), and outputs the data D(Tzcd) to the correction circuit 64c. The correction circuit 64c outputs the second command value Vc2, based on this D(Tzcd), through the same process as that described with FIG. 11. Accordingly, the power factor correction IC 35g can execute the correction with respect to the time period Ton2 described in Principle 2 in FIG. 6.

The storage circuit 95 is provided inside the power factor correction IC 35g according to an embodiment of the present disclosure, but may alternatively be a storage device provided outside the power factor correction IC 35g.

In each of the power factor correction ICs 35b to 35g according to embodiments of the present disclosure, the voltages Vcs, Vfb, Vrdiv are converted from analog to digital by the ADCs 50, 53, 65, respectively, and then the processes up to the output of the voltage Vo2 are performed. Part or all of the processes performed after the AC conversion by the ADCs 50, 53, 65 in the power factor correction ICs 35b to 35g may be executed by software. Specifically, a microcomputer, a DSP having a core and memory, or the like may execute the process in place of the power factor correction IC 35a.

<<Power Factor Correction IC 35h According to Example 7>>

Figure 19:
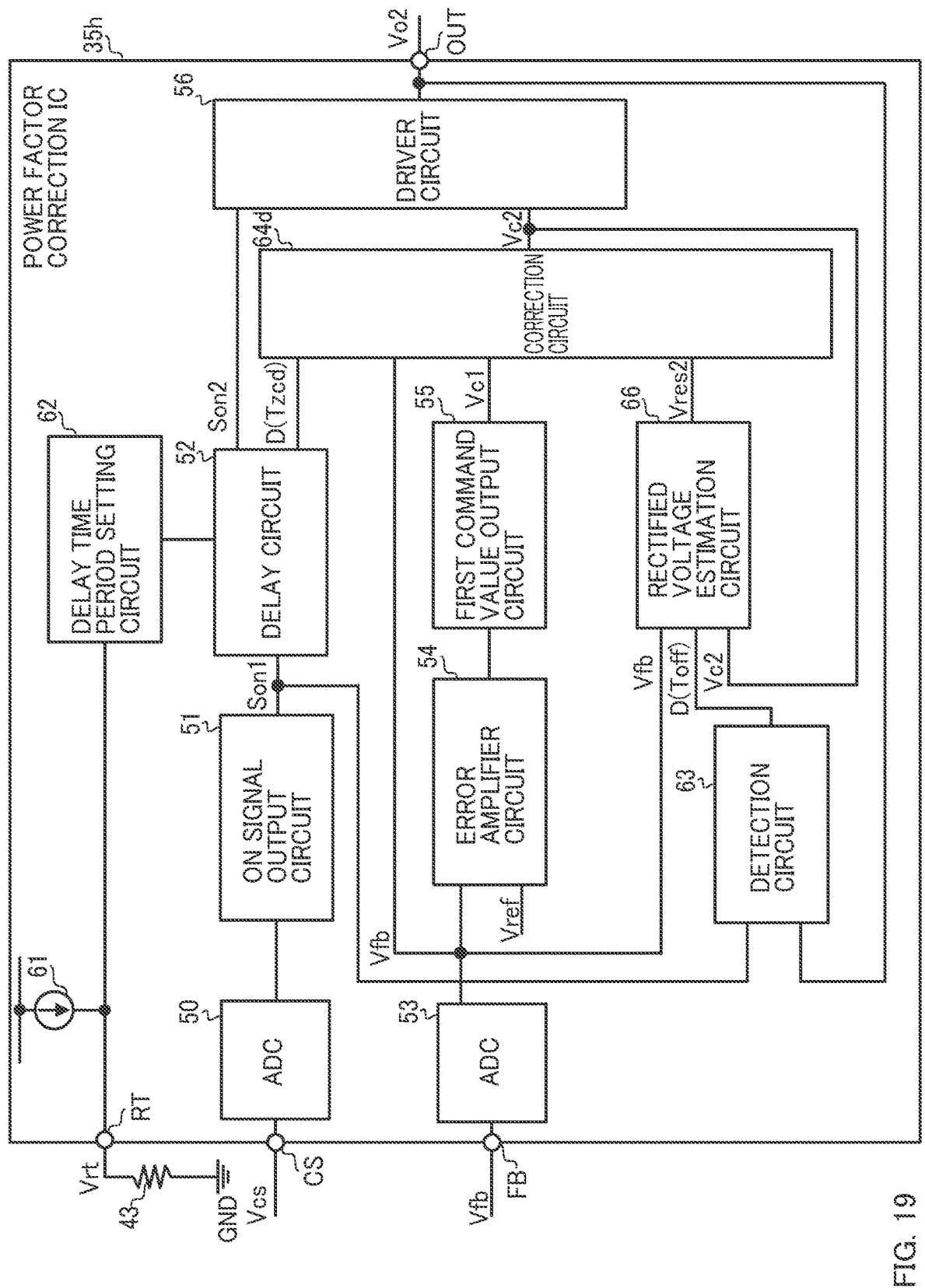
FIG. 19 illustrates an example configuration of a power factor correction IC 35h.

FIG. 19 illustrates an example configuration of a power factor correction IC 35h. The power factor correction IC 35h is an IC that is used in the AC-DC converter 10b in FIG. 7, similarly to the power factor correction IC 35b and the power factor correction IC 35c.

The power factor correction IC 35h includes the ADCs 50, 53, the on signal output circuit 51, the delay circuit 52, the error amplifier circuit 54, the first command value output circuit 55, the driver circuit 56, the current source 61, the delay time period setting circuit 62, the detection circuit 63, a correction circuit 64d, and a rectified voltage estimation circuit 66. Further, the power factor correction IC 35h has the terminals RT, CS, FB, OUT.

In other words, as compared to the power factor correction IC 35b in FIG. 11, the power factor correction IC 35h includes the correction circuit 64d in place of the correction circuit 64b and further includes the rectified voltage estimation circuit 66.

The rectified voltage estimation circuit 66 of the power factor correction IC 35h estimates the rectified voltage Vr using an approach different from that used by the estimation circuit 81 of the correction circuit 64b in FIG. 12, and outputs an estimated value Vres2. The rectified voltage estimation circuit 66 estimates the rectified voltage Vr, based on the voltage Vfb, the time period Ton2, and the time period Toff from when the NMOS transistor 36 is turned off to when the inductor current IL reaches 0.

Based on the estimated value Vres2 estimated by the rectified voltage estimation circuit 66, the correction circuit 64d calculates the correction value ΔTon for the time period Ton1 during which the NMOS transistor 36 is to be on. The correction circuit 64d then outputs the command value Vc2 corresponding to the time period Ton2 during which the NMOS transistor 36 is to be on.

The rectified voltage estimation circuit 66 corresponds to a "second estimation circuit."

Figure 20:
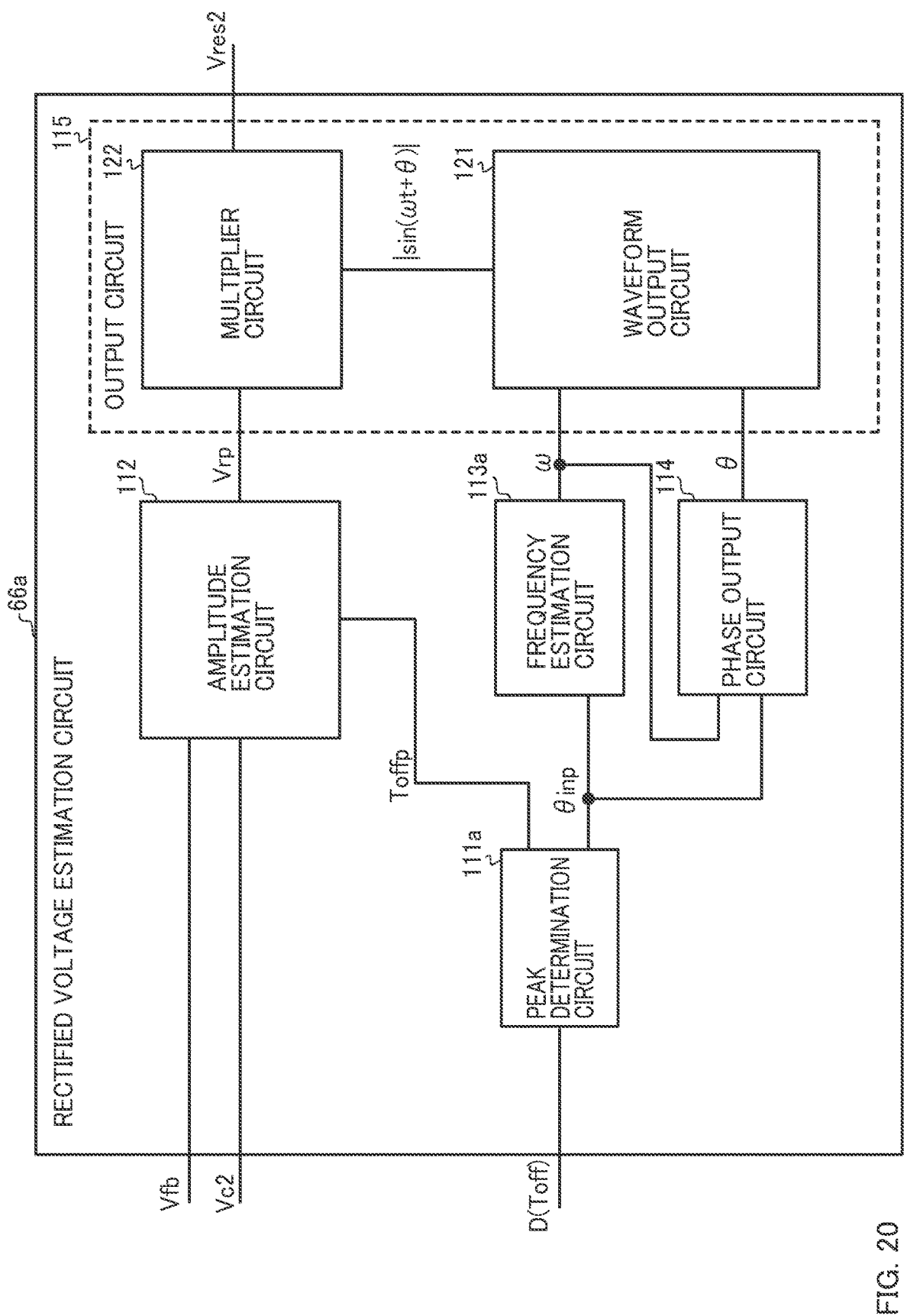

FIG. 20 illustrates an example configuration of a rectified voltage estimation circuit 66a. The rectified voltage estimation circuit 66a is one embodiment of the rectified voltage estimation circuit 66 in FIG. 19.

===Overview of Rectified Voltage Estimation Circuit 66a===

The rectified voltage Vr is a voltage obtained by full-wave rectifying the AC voltage Vac with noise removed by the inductor 21 and the capacitor 22 in the AC-DC converter 10b in FIG. 7. The rectified voltage Vr is given by Vr=|Vrp×sin (ω×t+θ)|, where Vrp is an amplitude, ω is a frequency, and sin (ω×t+θ) is a waveform based on a phase θ.

When ω×t+θ isaphase angle about 180 m degrees (m is an integer), the waveform sin (ω×t+θ) becomes small. For example, in a case of a phase angle of ±10+180 m degrees, the rectified voltage Vr and the input current Iin are in a "low phase."

In this case, the proportional relation established between the output voltage Vout and rectified voltage Vr of L of the inductor 33 and the time period Ton2 and time period Toff1 may have a discrepancy. For example, the resonance between the inductance L of the inductor 33 and the parasitic capacitance of the NMOS transistor 36 and the like may increase the time period Toff, and the effects of the resonance increase greater in a low phase. As a result, there may be discrepancies in the relational expressions such as (Vout−Vr)/Vr=Ton2/Toff or the Vres1=Vout×[Toff/(Ton2+Toff)].

Meanwhile, the discrepancy in the relational expression established between the output voltage Vout and rectified voltage Vr and the time period Ton2 and time period Toff1 is small when ωxt+θ is a phase angle of about 90+180 m degrees. For example, in a case of a phase angle of 80 to 110+180 m degrees, the rectified voltage Vr and the input current Iin are in a "high phase."

Thus, when ωxt+θ is a phase angle about 90+180 m degrees, the rectified voltage estimation circuit 66a estimates the amplitude Vrp of the rectified voltage Vr. In particular, the rectified voltage estimation circuit 66a estimates the amplitude Vrp of the rectified voltage Vr, when the time period Toff is a peak value Toffp in a half period of the rectified voltage Vr.

The rectified voltage estimation circuit 66a multiplies the amplitude Vrp estimated using Expression (14) at the peak value Toffp of the time period Toff and the waveform sin (ωxt+θ) estimated separately. The rectified voltage estimation circuit 66a can thus estimate an accurate rectified voltage Vr even when the rectified voltage Vr is in a low phase.

===Configuration of the Rectified Voltage Estimation Circuit 66a===

The rectified voltage estimation circuit 66a includes a peak determination circuit 111a, an amplitude estimation circuit 112, a frequency estimation circuit 113a, a phase output circuit 114, and an output circuit 115.

Based on the data D(Toff) on the time period Toff outputted from the detection circuit 63 in FIG. 19, the peak determination circuit 111a detects the peak value of the time period Toff corresponding to the command value Vc2, every time the time period Toff peaks. Further, the peak determination circuit 111a outputs, as a determination result, a signal einp that goes high in a pulsed form, every time the time period Toff peaks.

For example, the peak determination circuit 111a determines, as a peak, a point of inflection at which the temporal change of the time period Toff goes − from +.

The amplitude estimation circuit 112 estimates the amplitude Vrp of the rectified voltage Vr based on the voltage Vfb, the peak value Toffp, and the command value Vc2 corresponding to the time period Ton2.

Here, when the NMOS transistor 36 has been on for the time period Ton2, the relation of Expression (12) is established between the local maximum value ILp2 (see FIG. 10) of the inductor current IL2 flowing through the inductor 33 having the inductance L, and the amplitude Vrp which is the local maximum value of the rectified voltage Vr.

$$ILp2=(Vrp \times Ton2)/L \quad (12)$$

Then, the NMOS transistor 36 has been off during the peak value Toffp of the time period Toff, bringing the inductor current IL2 to 0.

The higher the phase angles of the rectified voltage Vr and the inductor current IL2 are, the longer the time period Toff from when the NMOS transistor 36 is turned off to when the inductor current IL2 reaches 0 is. For example, when the phase angle is 90 degrees (or 270 degrees, 450 degrees, or the like), the rectified voltage Vr has the amplitude Vrp which is the local maximum value. In this case, the inductor current IL2 is also large, and thus the time period Toff from when the NMOS transistor 36 is turned off to when the inductor current IL2 reaches 0 is also the peak value Toffp.

Accordingly, at the phase angle at which the rectified voltage Vr has the amplitude Vrp, the time period Toff is also the peak value Toffp.

In this case, Expression (13) is established among the peak value Toffp, the inductance L of the inductor 33, the local maximum value ILp2 of the inductor current IL2, the output voltage Vout, and the amplitude Vrp of the rectified voltage Vr.

$$Toffp=(L \times ILp2)/(Vout-Vrp) \quad (13)$$

Based on Expressions (12), (13), the amplitude estimation circuit 112 estimates the amplitude Vrp assuming that the amplitude Vrp satisfies Expression (14).

$$Vrp=Vout/(1+(Ton2/Toffp)) \quad (14)$$

The frequency estimation circuit 113a estimates the frequency ω of the rectified voltage Vr by measuring a time period between a plurality of peak values Toffp in response to the high signal θinp. The time period between the peak values Toffp is a half period Tin corresponding to the phase angle of the 180 degrees of the rectified voltage Vr. Although details will be described later, the frequency estimation circuit 113a can estimate the frequency ω by measuring the half period Tin and using the relational expression of the frequency ω=2π/2Tin.

The phase output circuit 114 outputs the phase θ of the rectified voltage Vr based on the high signal θinp and the estimated frequency ω.

Specifically, in response to the high signal θinp, the phase output circuit 114 measures the time period that has elapsed since the time period Toff has reached the peak value Toffp. The phase output circuit 114 calculates the phase angle of the rectified voltage Vr, using the timing at which the time period Toff reaches the peak value Toffp, as the timing at which the phase angle of the rectified voltage Vr reaches 90±180 m degrees. In particular, based on the time period that has elapsed since the timing at which the phase angle of the rectified voltage Vr reaches 90±180 m degrees, the phase output circuit 114 calculates such that the rectified voltage Vr has a phase angle of (elapsed time/half period Tin)×180 degrees. Accordingly, the phase output circuit 114 outputs information on the phase θ of the rectified voltage Vr.

The output circuit 115 outputs the estimated value Vres2 of the rectified voltage Vr, based on the estimated amplitude Vrp, the estimated frequency ω, and the phase information. Further, the output circuit 115 includes a waveform output circuit 121 and a multiplier circuit 122.

The waveform output circuit 121 outputs the waveform |sin(ωxt+θ)| of the rectified voltage Vr, based on the estimated frequency ω and the phase information. The multiplier circuit 122 calculates an estimated value Vres2=|Vrp×sin(ωxt+θ)| by multiplying the estimated amplitude Vrp and the waveform |sin(ωxt+θ)| and outputs the estimated value Vres2.

===Operation of the Rectified Voltage Estimation Circuit 66a===

Figure 21:
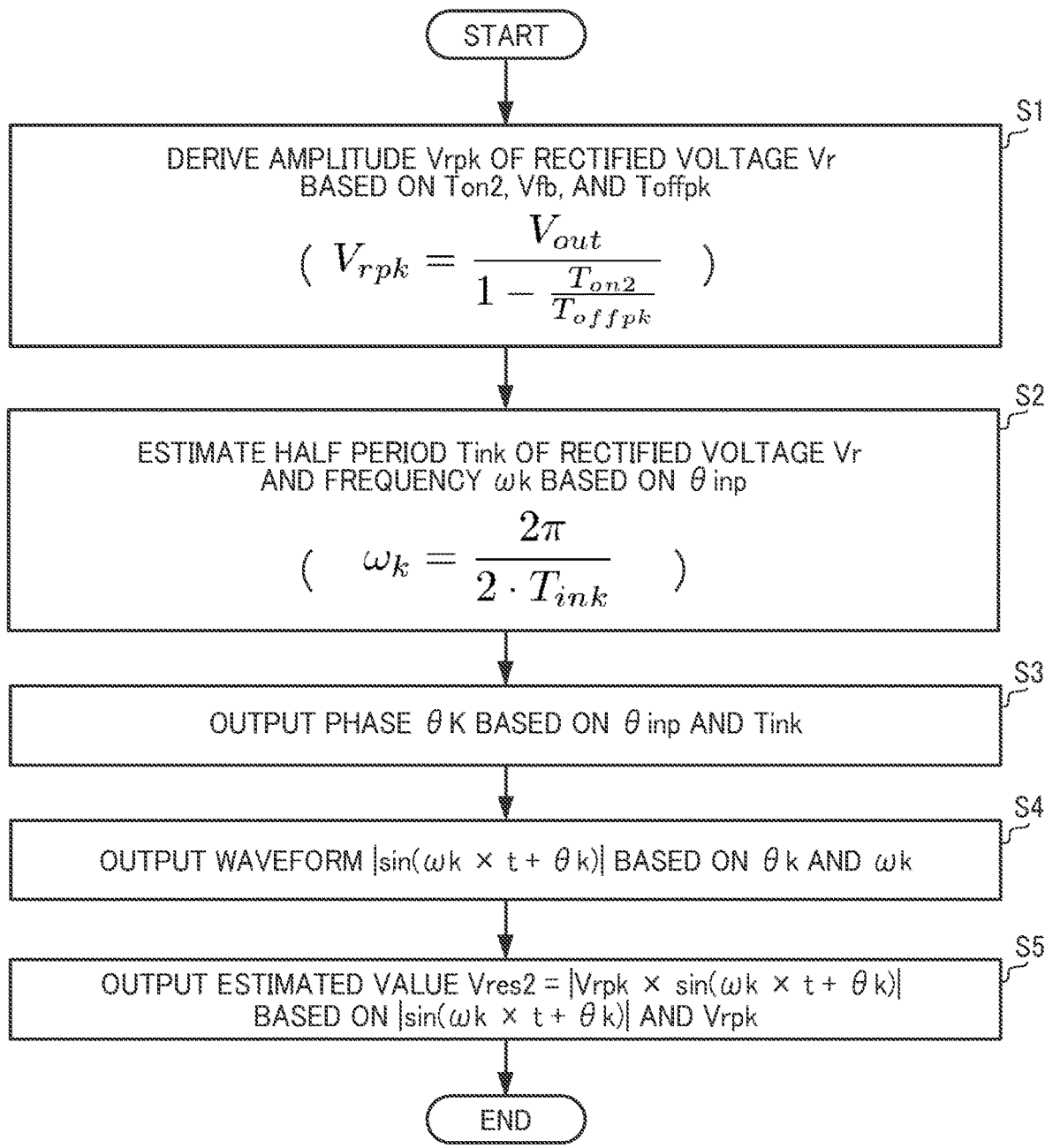
Figure 22:
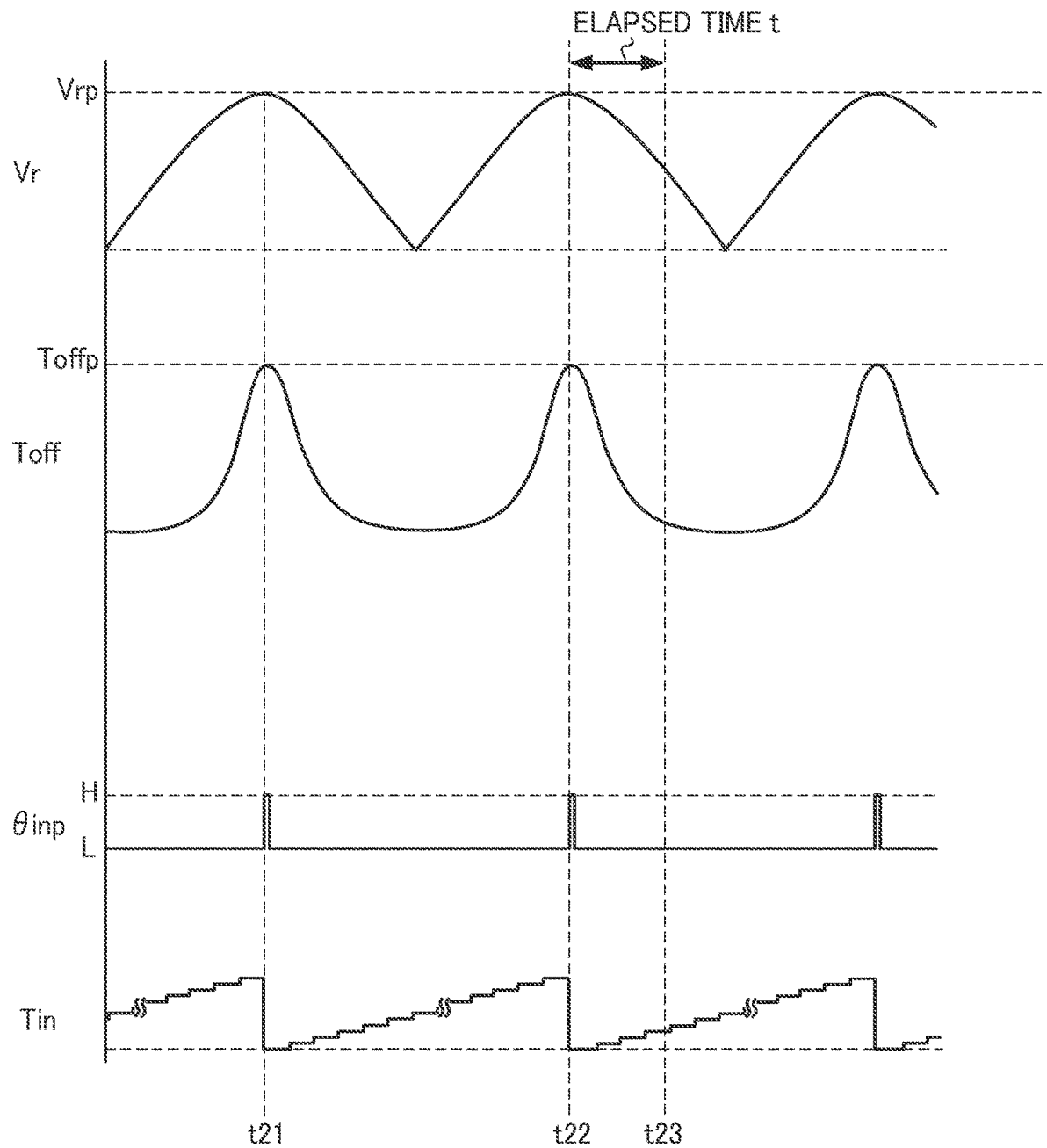

With reference to FIGS. 21 and 22, the operation of the rectified voltage estimation circuit 66a will be described. FIG. 21 is a flowchart illustrating the operation of the rectified voltage estimation circuit 66a, and FIG. 22 illustrates the main waveforms in the operation of the rectified voltage estimation circuit 66a. Note that the peak values Toffp of the time period Toff are given the same value in FIG. 22, for convenience of illustration.

The following describes assuming that time t23 is a time after passing time t22 in FIG. 22.

Note that the peak values Toffp of Toff at the times t21, t22 are referred to as peak values Toffpk−1, Toffpk, respectively. Toffpk−1 is the (k−1)-th peak value, and Toffpk is the k-th peak value (k is a natural number not less than 2).

The amplitude estimation circuit 112 estimates the amplitude Vrpk of the rectified voltage Vr, based on the voltage Vfb corresponding to the voltage Vout, the second command value Vc2 corresponding to the time period Ton2, and the peak value Toffpk at time t22, for example (S1). Because the amplitude Vrp satisfies Expression (14), the amplitude Vrpk at time t22 is estimated by Vrpk=Vout/(1+(Ton2/Toffpk)).

The frequency estimation circuit 113a estimates the frequency ωk of the rectified voltage Vr, for example, based on the time period between time t21 at which the (k−1)-th peak value Toffpk−1 is determined and time t22 at which the k-th peak value Toffpk is determined (S2).

Specifically, the frequency estimation circuit 113a starts time measurement in response to the high signal θinp, to measure a time period Tin, which is until when the next high signal θinp is received.

Then, the frequency estimation circuit 113a calculates the k-th frequency ωk by ωk=2π/(2×Tink) using the above time period as the k-th half period Tink of the rectified voltage Vr, and outputs data on the frequency ωk.

It is assumed here that the frequency estimation circuit 113a estimates the frequency ωk, based on the time of the (k−1)-th peak value Toffpk−1 and the time of the k-th peak value Toffpk, every time the peak value is determined, however, the present disclosure is not limited to this. For example, the frequency estimation circuit 113a may use the average value of a plurality of frequencies estimated in the past as an estimation result.

Further, the frequency of the AC voltage Vac is generally a predetermined specified frequency (e.g., 50 Hz or 60 Hz). Accordingly, the frequency estimation circuit 113a may select a specified frequency closest to the estimated frequency, and output the selected result as the frequency ωk to the waveform output circuit 121.

The phase output circuit 114 outputs information on the phase θk of the rectified voltage Vr at time t23 (S3).

Specifically, in response to the high signal θinp, the phase output circuit 114 starts time measurement, assuming that the phase angle of the rectified voltage Vr has reached 90+180k degrees at time t22.

The phase output circuit 114 can read the half period Tink from the frequency ωk outputted from the frequency estimation circuit 113a. Accordingly, the phase output circuit 114 can calculate such that the phase angle of the rectified voltage Vr from time t22 is the phase angle of (elapsed time t/Tink)×180 degrees.

The phase output circuit 114 thus outputs information on the phase θk of the rectified voltage Vr at time t23, for example.

Next, based on the frequency ωk and the information on the phase θk, the waveform output circuit 121 outputs the waveform |sin (ωk×t+θk)| of the rectified voltage Vr (S4). Further, the multiplier circuit 122 calculates the estimated value Vres2=|Vrpk×sin(ωk×t+θk)| by multiplying the amplitude Vrpk and the waveform |sin(ωk×t+θk)|, and outputs the estimated value Vres2. Accordingly, the rectified voltage estimation circuit 66a outputs the estimated value Vres2 (S5).

===Configuration of the Correction Circuit 64d===

Figure 23:
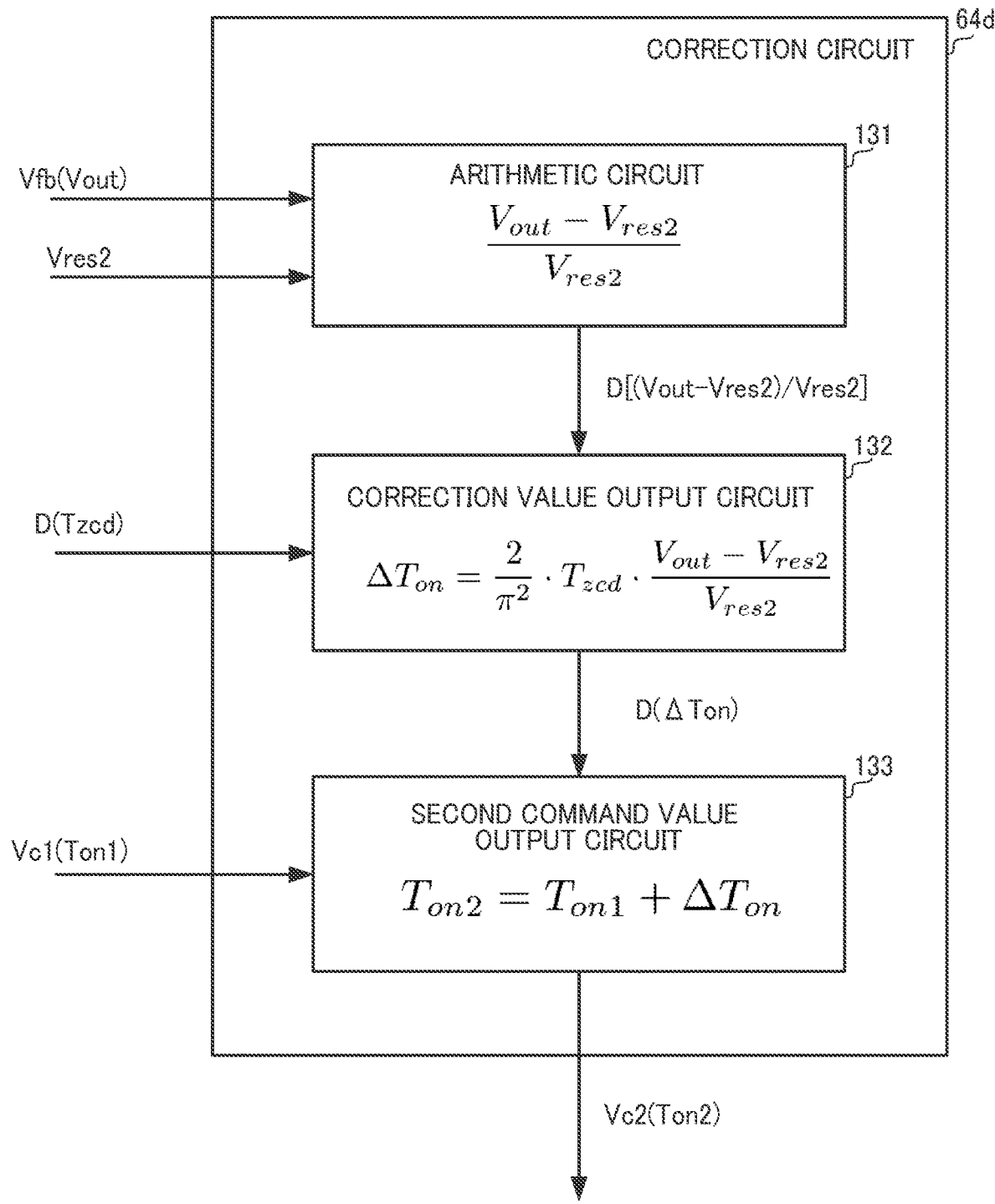
FIG. 23 illustrates an example configuration of a correction circuit 64d.

FIG. 23 illustrates an example configuration of the correction circuit 64d. The correction circuit 64d includes an arithmetic circuit 131, a correction value output circuit 132, and a second command value output circuit 133.

The arithmetic circuit 131 calculates a ratio (Vout−Vres2)/Vres2, based on the estimated value Vres2 of the rectified voltage Vr and the voltage Vfb corresponding to the voltage Vout, and outputs data D[(Vout−Vres2)/Vres2] on the ratio.

The correction value output circuit 132 calculates the correction value ΔTon, based on the data D(Tzcd), the data D[(Vout−Vres2)/Vres2], and the constant (2/π2) stored in the correction value output circuit 132. The correction value output circuit 132 outputs the correction value ΔTon which is based on ΔTon=(2/π2)×Tzcd×(Vout−Vres2)/Vres2.

The second command value output circuit 133 outputs the time period Ton2 which is based on Ton2=Ton1+ΔTon, based on the command value Vc1 corresponding to the time period Ton1 and the correction value ΔTon.

The arithmetic circuit 131 corresponds to an "arithmetic circuit."

As has been described above, the correction circuit 64d calculates the time period Ton2, based on the estimated value Vres2 of the voltage Vr when the time period Toff peaks and the phase angle is about 90±180 m degrees. Thus, even when the phase angle is a low phase, an appropriate time period Ton2 is set to cancel out the negative value of the inductor current IL2 in FIG. 6.

Based on the time period Ton2, the driver circuit 56 of the power factor correction IC 35h in FIG. 19 can output the signal Vo2 to turn on the NMOS transistor 36. Accordingly, the AC-DC converter including the power factor correction IC 35h can eliminate the dead angle of the inductor current IL2, to thereby correct the power factor.

===Configuration of the Rectified Voltage Estimation Circuit 66b===

Figure 24:
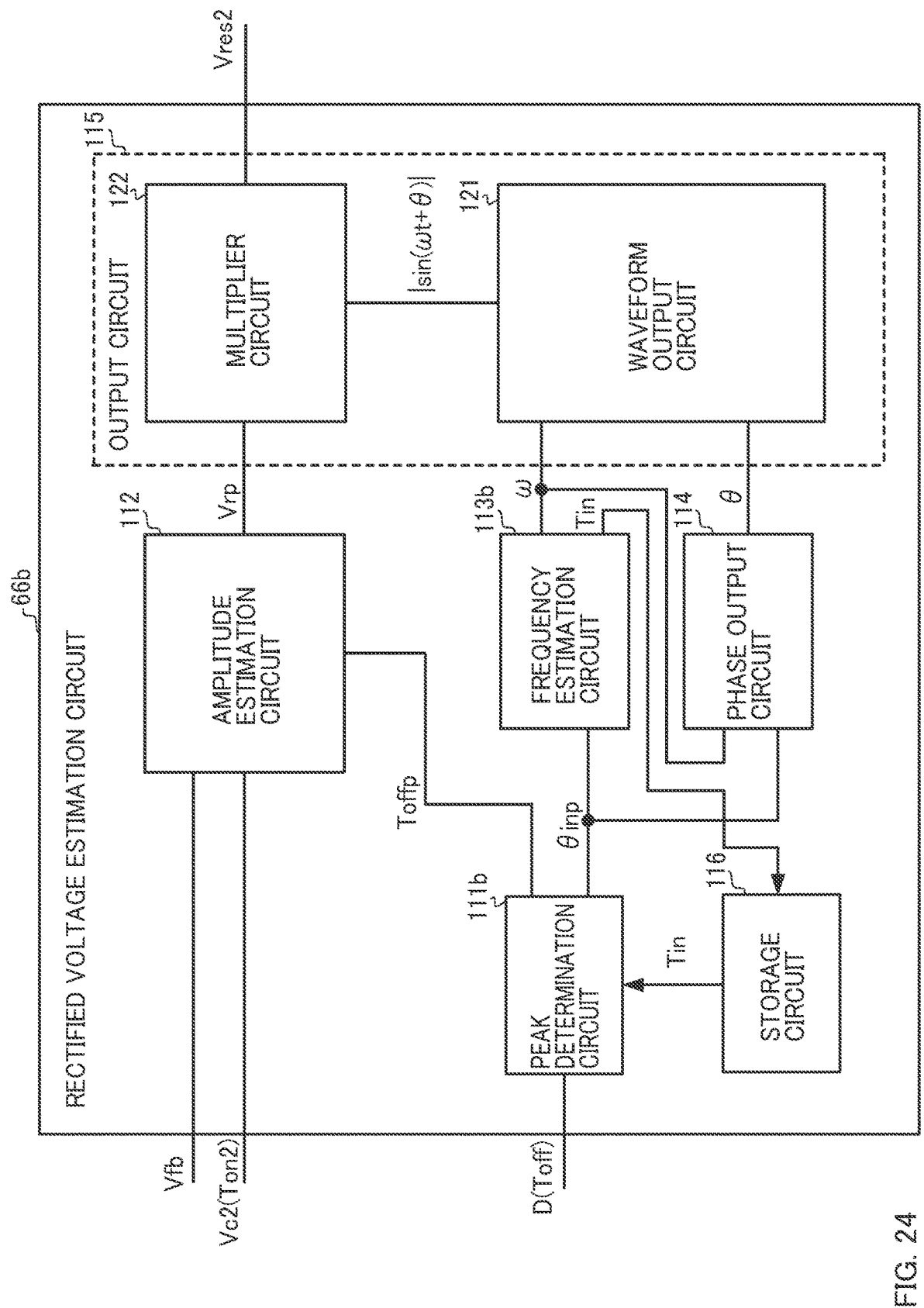
FIG. 24 illustrates an example configuration of a rectified voltage estimation circuit 66b.

FIG. 24 illustrates an example configuration of a rectified voltage estimation circuit 66b. The rectified voltage estimation circuit 66b is another embodiment of the rectified voltage estimation circuit 66 in FIG. 19.

The rectified voltage estimation circuit 66b includes a peak determination circuit 111b, the amplitude estimation circuit 112, a frequency estimation circuit 113b, the phase output circuit 114, the output circuit 115, and a storage circuit 116. In other words, the rectified voltage estimation circuit 66b is different from the rectified voltage estimation circuit 66a in including the peak determination circuit 111b in place of the peak determination circuit 111a, the frequency estimation circuit 113b in place of the frequency estimation circuit 113a, and additionally the storage circuit 116.

The peak determination circuit 111b performs a screening process of determining whether to use the new peak value Toffpk for the subsequent estimation, when a new peak value (for example, the k-th peak value Toffpk) is determined, based on the recorded half periods Tin.

It is assumed here that, T2 is a timing corresponding to the peak value Toffpk, and T1 is a timing corresponding to the previous (i.e., (k−1)-th) peak value Toffpk−1.

The peak determination circuit 111b compares T2−T1 with, for example, the average value Tave of the plurality of half periods Tin out of a plurality of half periods Tin stored in the storage circuit 116 which will be described later, to thereby determines a peak.

When T2−T1 is within a range of a certain percentage (e.g., 20%) of the average value Tave, the peak determination circuit 111b determines to use the peak value Toffpk for the subsequent estimation. When T2−T1 is outside the range, the peak determination circuit 111b uses the value of the time period Toff which is from T1 to when the half period Tin has elapsed, instead of Toffpk, as a peak value for the subsequent estimation.

It is assumed that the peak determination circuit 111b uses the average value Tave, however, the peak determination circuit 111b may use the value of a half period corresponding to the specified frequency (50 Hz or 60 Hz) selected based on the average value Tave.

Every time the frequency is estimated, the frequency estimation circuit 113b stores, as a half period Tin, a time period of half of the period corresponding to the estimated frequency, in the storage circuit 116.

The storage circuit 116 has recorded therein the half period Tin of the rectified voltage Vr. The following describes details of the operation of these circuits included in the rectified voltage estimation circuit 66b, with reference to FIGS. 25 to 27.

===Operation of Rectified Voltage Estimation Circuit 66b===

Figure 25:
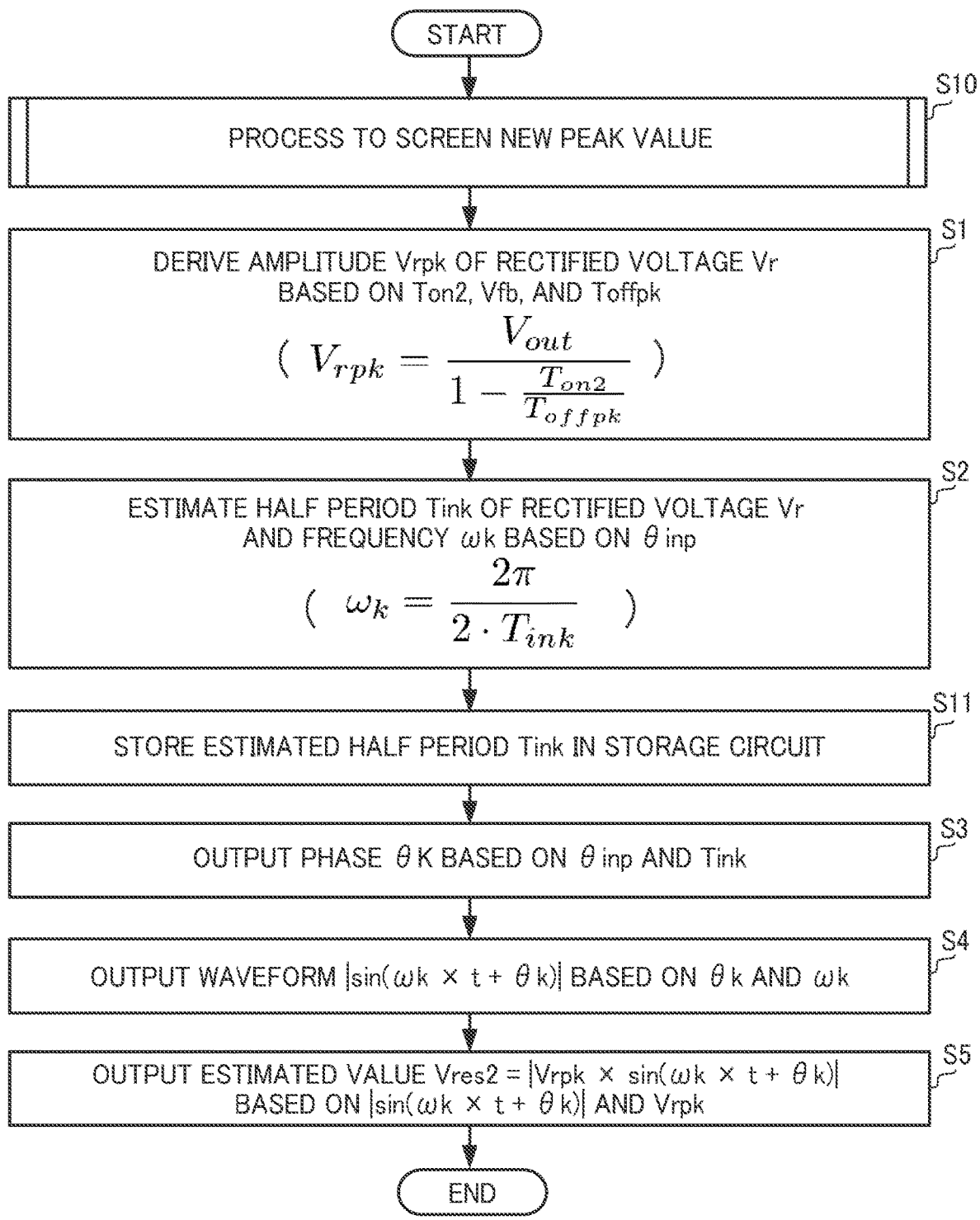
FIG. 25 illustrates the operation of a rectified voltage estimation circuit 66b.

FIG. 25 illustrates the operation of the rectified voltage estimation circuit 66b. The flowchart in FIG. 25 is different from that in FIG. 21 in including S10 and S11.

===Details of Step S10===

Figure 26:
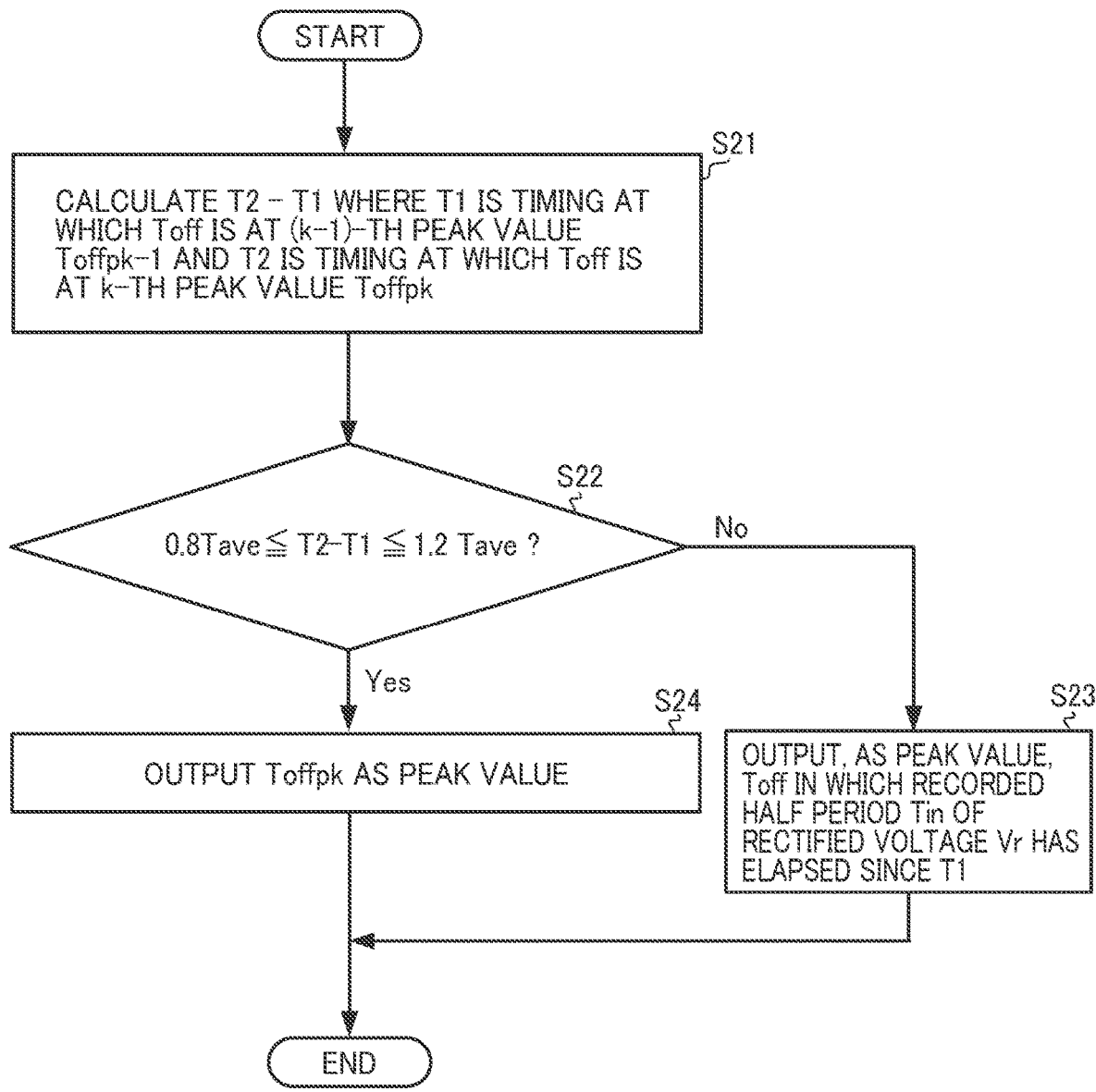
FIG. 26 illustrates the operation in Step S10.

The operation of the rectified voltage estimation circuit 66b will be described with reference to FIGS. 26 and 27. FIG. 26 is a flowchart explaining the operation of the rectified voltage estimation circuit 66b in Step S10, and FIG. 27 illustrates waveforms for explaining the operation of the rectified voltage estimation circuit 66b.

Figure 27:
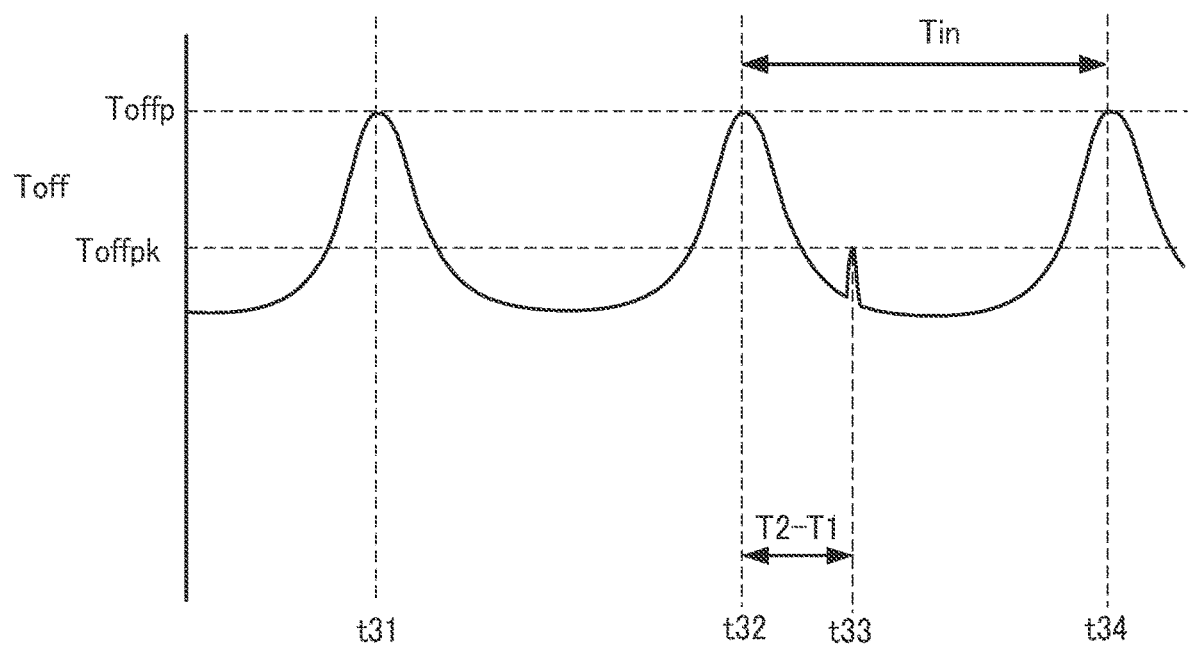
FIG. 27 illustrates a waveform illustrating the operation in Step S10.

Note that, in FIG. 27, the peak values Toffp of the time period Toff are given as the same value except for the one at t33, for convenience of illustration. The peak value at time t31 is the (k=2)-th peak value Toffpk=2, and the peak values at times t32, t33 are the (k−1)-th peak value Toffpk−1 and the k-th peak value Toffpk, respectively (in this case, k is a natural number not less than 3).

In response to determining the k-th peak value Toffpk, the peak determination circuit 111b calculates a time period T2−T1 between the timing T2 (time t33) corresponding to the peak value Toffpk and the timing T1 (time t32) at which the previous (i.e., (k−1)-th) peak value Toffpk−1 has been determined (S21).

The k-th peak value Toffpk corresponds to a "first peak value," and the (k−1)-th peak value Toffpk−1 corresponds to a "second peak value."

The peak determination circuit 111b reads values of the half periods Tin with respect to the recorded past peaks from the storage circuit 116, and calculates the average value Tave. Further, the peak determination circuit 111b determines whether the time period T2−T1 is within a range of 20% of the time period Tave (S22). In other words, the peak determination circuit 111b determines whether 0.8Tave≤T2−T1≤1.2Tave is satisfied. A process proceeds to S24 when the time period T2−T1 is within the range of 20%, and proceeds to S23 when the time period T2−T1 is outside the range of 20%.

Note that, in FIG. 27, the k-th peak value Toffpk is a peak Toffpk determined at t33. Note that this peak occurs, for example, when the AC voltage Vac or the state of the load 11 coupled to the AC-DC converter suddenly changes.

Here, T2−T1 does not satisfy 0.8Tin T2−T1>1.2Tin, where T2 is time t33, and T1 is time t32. Accordingly, in the case of the example in FIG. 27, the process proceeds to Step S23.

The percentage 20% is an example herein. This percentage is not limited to 20%, and may be set to 30% or 10%. In these cases, the peak determination circuit 111b determines whether the time period T2−T1 is within the range of 0.7Tave T2−T1≤1.3Tave and the range of 0.9Tave≤T2−T1≤1.1Tave, respectively. Note that 20% corresponds to the "predetermined percentage" of the "half period."

In the example in FIG. 27, 0.8Tin≤T2−T1≤1.2Tin is not satisfied, and thus the peak determination circuit 111b does not output the peak value Toffpk at time t33. Instead, the peak determination circuit 111b outputs, as a peak value, Toff at time t34 at which the half period Tin has elapsed since time t33 (the timing T1) (S23).

Accordingly, the peak determination circuit 111b determines that the peak at t33 in FIG. 27 is an outlier due to noise and/or the like. As such, the peak determination circuit 111b can execute the process of screening a peak value so as not to output the peak value when the peak value is an outlier. After S23, the process S10 ends.

When 0.8Tin≤T2−T1≤1.2Tin is satisfied (unlike in the example in FIG. 27), the peak determination circuit 111b outputs the peak value Toffpk (S24). After S24, the process S10 ends.

After the process S10 ends, the processes of S1, S2 in FIG. 25 are performed. These processes are the same as those given the same reference numerals in FIG. 21. However, in the example of FIG. 27, Toff at time t34 is outputted as a peak value in S23, and thus this value is used as Toffpk in S1.

After S2, the frequency estimation circuit 113b stores, in the storage circuit 116, a time period which is half of the period corresponding to the estimated frequency ωk as the half period Tink (S11). The processes S3 to S5 performed thereafter are the same as those given the same reference numerals in FIG. 21.

As has been described above, the rectified voltage estimation circuit 66b can exclude, as an outlier, a peak value Toffpk having occurred due to a sudden change in, for example, the AC voltage Vac and/or the load. Thus, in the rectified voltage estimation circuit 66b, the peak determination circuit 111b can determine the peak value Toffp of the time period Toff more accurately, which makes the estimation of the rectified voltage Vr based on the time period Toffp more accurate.

Accordingly, the correction circuit 64d can set an appropriate time period Ton2 during which the NMOS transistor 36 is on, and thus the AC-DC converter including the power factor correction IC 35h can correct the power factor.

===Configuration of the Rectified Voltage Estimation Circuit 66c===

Figure 28:
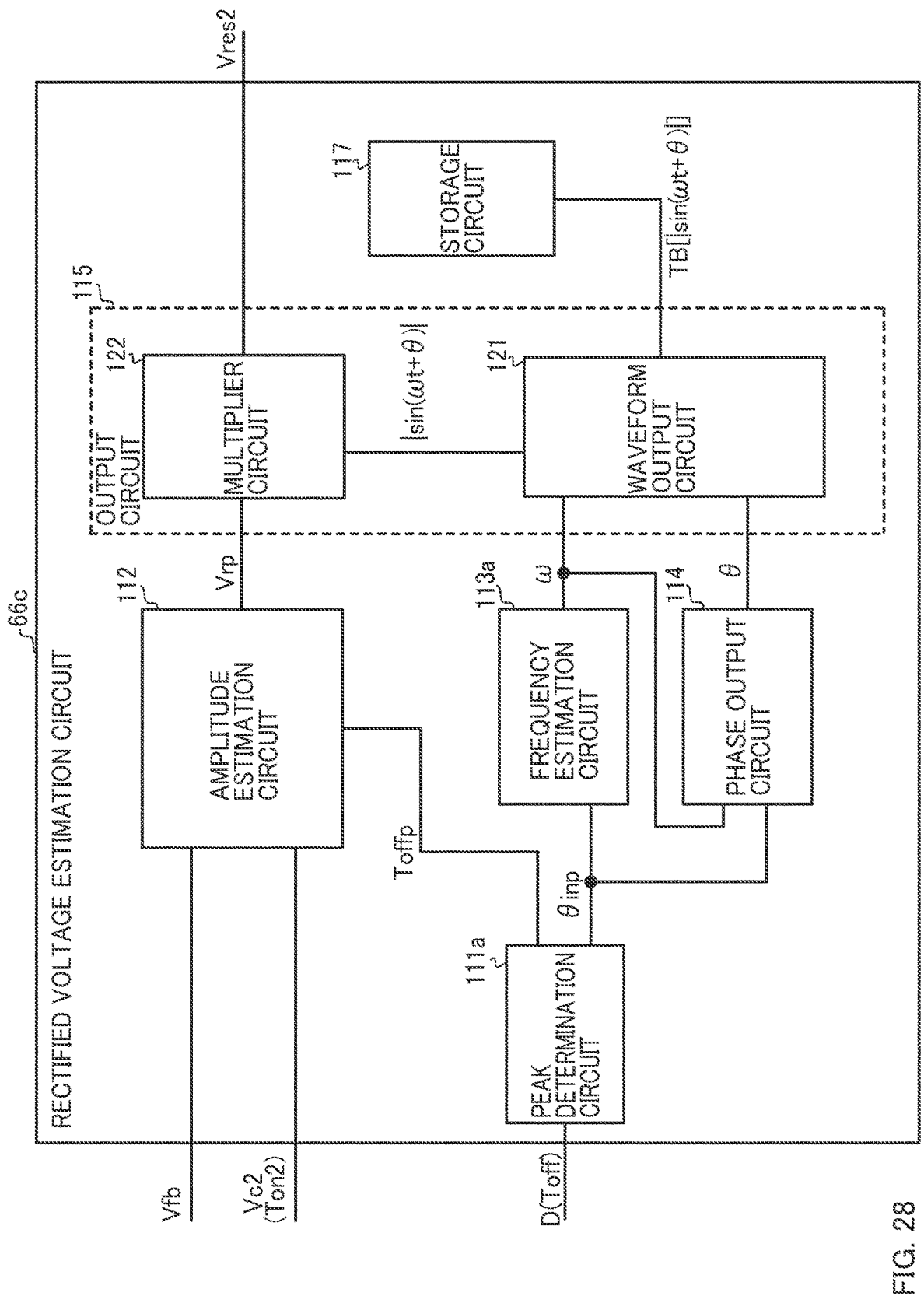
FIG. 28 illustrates an example configuration of a rectified voltage estimation circuit 66c.

FIG. 28 illustrates an example configuration of a rectified voltage estimation circuit 66c. The rectified voltage estimation circuit 66c is another embodiment of the rectified voltage estimation circuit 66 in FIG. 19.

The rectified voltage estimation circuit 66c includes the peak determination circuit 111a, the amplitude estimation circuit 112, the frequency estimation circuit 113a, the phase output circuit 114, the output circuit 115, and a storage circuit 117. In other words, the rectified voltage estimation circuit 66c is different from the rectified voltage estimation circuit 66a in including the storage circuit 117 coupled to the waveform output circuit 121.

The rectified voltage estimation circuit 66c is different from the rectified voltage estimation circuit 66a in how the waveform output circuit 121 operates after receiving the frequency ω from the frequency estimation circuit 113a and phase information from the phase output circuit 114.

The storage circuit 117 has recorded therein a table TB|sin(ωxt+θ)| of data on the waveform |sin(ωxt+θ)| of the rectified voltage Vr with normalized amplitude Vrp.

Accordingly, the waveform output circuit 121 can read the table TB|sin(ωxt+θ)| of the waveform data from the storage circuit 117, based on the frequency of the rectified voltage Vr (for example, 50 Hz or 60 Hz) and information on the input phase detected from the timing at which the time period Toff is the peak value Toffp. The waveform output circuit 121 thus can output the waveform data $|\sin(\omega \times t+\theta)|$ on the rectified voltage Vr. The output circuit 115 thus outputs the estimated value Vres2 of the rectified voltage Vr using the waveform data $|\sin(\omega \times t+\theta)|$.

The operations of other circuits in the rectified voltage estimation circuit 66c are the same as those in the rectified voltage estimation circuit 66a.

In the rectified voltage estimation circuit 66c, the waveform output circuit 121 can acquire the waveform data from the storage circuit 117, to thereby reduce the amount of calculation performed by the power factor correction IC 35h.

The rectified voltage estimation circuit 66c also can estimate the rectified voltage Vr appropriately, and the correction circuit 64d can set the time period Ton2 based on the estimated value Vres2. Accordingly, the AC-DC converter including the power factor correction IC 35h can correct the power factor when using the rectified voltage estimation circuit 66c as well.

The storage circuit 117 corresponds to a "second storage circuit."

<<Power Factor Correction IC 35i According to Example 8>>

Figure 29:
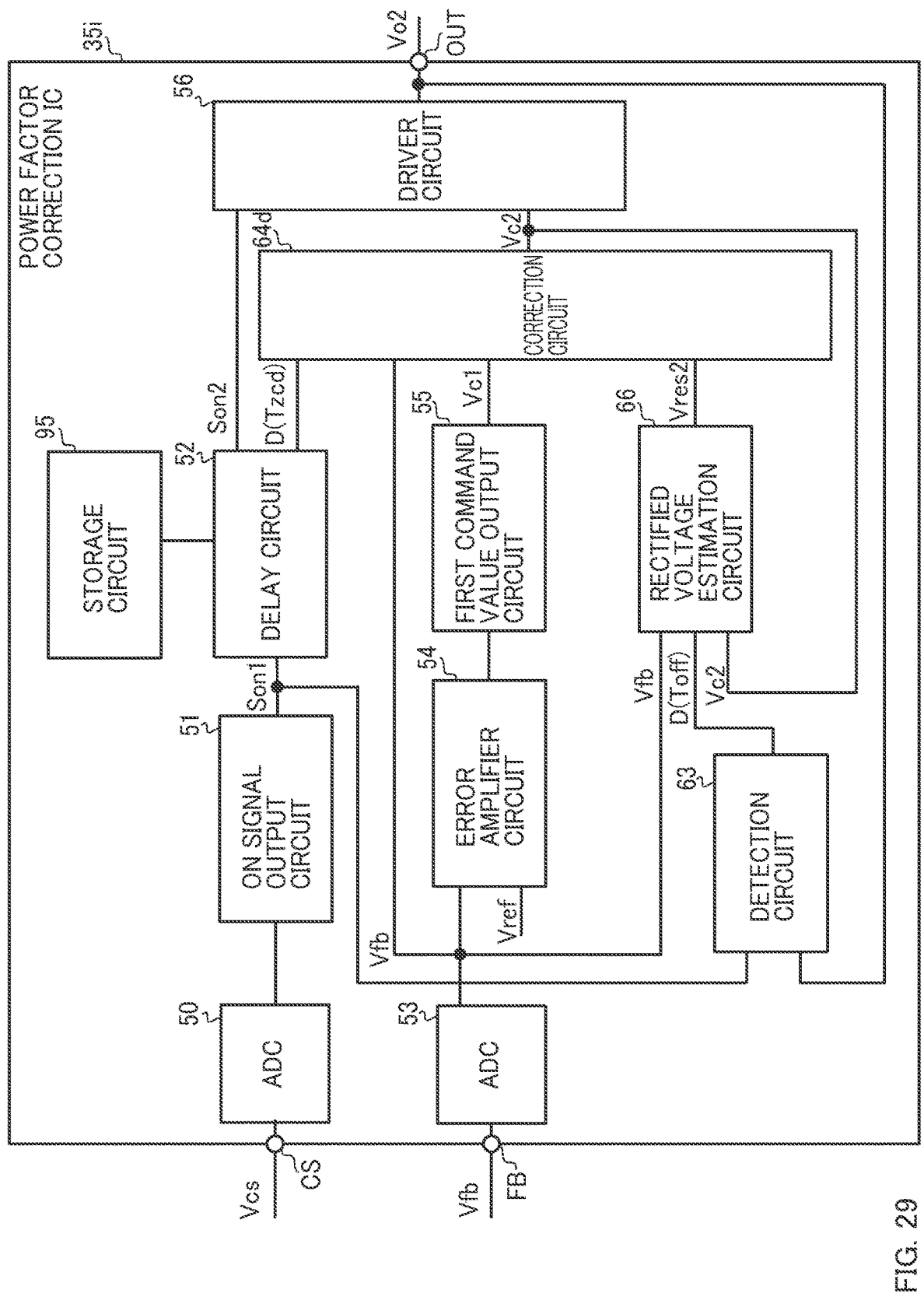
FIG. 29 illustrates an example configuration of a power factor correction IC 35i.

FIG. 29 illustrates an example configuration of a power factor correction IC 35i. The power factor correction IC 35i includes the ADCs 50, 53, the on signal output circuit 51, the delay circuit 52, the error amplifier circuit 54, the first command value output circuit 55, the driver circuit 56, the detection circuit 63, the correction circuit 64d, the storage circuit 95, and the rectified voltage estimation circuit 66. The power factor correction IC 35i has the terminals CS, FB, OUT as well.

The power factor correction IC 35i may be used in an AC-DC converter that is similar to an AC-DC converter including the power factor correction IC 35f in FIG. 17. In the power factor correction IC 35i, the storage circuit 95 sets a time period Tzcd that satisfies Expression (11), similarly to the power factor correction IC 35f.

As compared to the power factor correction IC 35f, the power factor correction IC 35i includes the correction circuit 64d in place of the correction circuit 64b, and further includes the rectified voltage estimation circuit 66. In other words, in the power factor correction IC 35i, the rectified voltage estimation circuit 66 estimates the rectified voltage Vr and outputs the estimated value Vres2, similarly to the power factor correction IC 35h in FIG. 19.

Further, the correction circuit 64d calculates the correction value ΔTon for the time period Ton1 during which the NMOS transistor 36 is to be on, based on the estimated value Vres2, and outputs the command value Vc2 corresponding to the time period Ton2 during which the NMOS transistor 36 is to be on.

In the power factor correction IC 35i, the storage circuit 95 sets the time period Tzcd that satisfies Expression (11), to the delay circuit 52, similarly to the power factor correction IC 35f in FIG. 17.

$$Tzcd = \pi \times \sqrt{(L \cdot C)} \quad (11)$$

In the power factor correction IC 35i in which the delay time period Tzcd is set by the storage circuit 95, the correction circuit 64d can appropriately set the time period Ton2 based on the estimated value Vres2, similarly to the power factor correction IC 35h. Accordingly, the AC-DC converter including the power factor correction IC 35i also can eliminate the dead angle of the inductor current IL2, to thereby improve the power factor.

In each of the power factor correction ICs 35h, 35i, the ADCs 50, 53 convert the voltages Vcs, Vfb from analog to digital, respectively, and then processes up to the output of the voltage Vo2 are performed. Part or all of the processes performed after the AD conversion by the ADCs 50, 53 in the power factor correction ICs 35h, 35i may be executed by software.

===Summary===

The AC-DC converters 10b, 10c and the power factor correction ICs 35b to 35g according to embodiments of the present disclosure have been described above.

To reduce switching loss in the NMOS transistor 36, the power factor correction ICs 35b to 35g delay the on signal Son1 for the NMOS transistor 36. According to this configuration, the on time period Ton2 for the NMOS transistor 36 can be obtained by correcting, without excess or deficiency, the amount of a decrease in the inductor current IL2 associated with the delay of the on signal Son1, thereby being able to correct the power factor.

The power factor correction ICs 35b to 35d each include the terminal RT to receive the voltage Vrt corresponding to the predetermined time period Tzcd, and the delay time period setting circuit 62 configured to set the predetermined time period Tzcd to the delay circuit 52, based on the voltage Vrt.

This makes it possible to set an appropriate time period Tzcd as a delay time period corresponding to the voltage Vrt generated at the terminal RT.

The power factor correction ICs 35b to 35d each include the current source 61 as a bias current source configured to supply a predetermined current to the terminal RT, and the resistor 43 is coupled to the terminal RT.

Thus, the time period Tzcd can be set as a delay time period corresponding to the resistance of the resistor 43 provided outside the power factor correction ICs 35b to 35d.

In addition, in the power factor correction ICs 35e to 35g, the delay circuit 52 delays the on signal Son1 by the predetermined time period Tzcd determined based on the inductance L of the inductor 33 and the capacitance C of the parasitic capacitor 38 that resonates the inductor current IL2 together with the inductor 33.

Accordingly, in the power factor correction ICs 35e to 35g, an appropriate time period Ton2 during which the NMOS transistor 36 is on can be set with respect to the time period Tzcd in which the drain-source voltage Vds of the NMOS transistor 36 exhibits a local minimum value due to the resonance based on the inductance L and the capacitance C. Thus, reduction in the switching loss of the NMOS transistor 36 and the correction of the power factor of the AC-DC converter can be achieved at the same time.

In addition, the power factor correction ICs 35e to 35g each include the storage circuit 95 configured to have recorded therein the time period Tzcd corresponding to the inductance L and the capacitance C.

This makes it possible to set an appropriate time period Ton2 during which the NMOS transistor 36 is on, with respect to the time period Tzcd, which is based on the inductance L and the capacitance C and is recorded in the storage circuit 95.

In addition, the power factor correction IC 35b, 35c, 35e, 35f includes the detection circuit 63 configured to detect the time period Toff based on a timing at which the NMOS transistor 36 is turned off and a timing at which the inductor current IL2 reaches 0.

This enables the power factor correction IC 35*b*, 35*c*, 35*e*, 35*f* to detect the time period Toff. Accordingly, the power factor can be corrected without using the voltage Vrdiv based on the rectified voltage Vr as an input to the correction circuit 64*a*, 64*b*.

Accordingly, load on the entire circuit can be reduced without the need to have a configuration such as a voltage divider circuit configured with the resistors 43 and 44 to input the voltage Vrdiv from the AC-DC converter 10*b* to the power factor correction IC 35*b*, 35*c*, 35*e*, 35*f*. Also, the terminal RDIV can be omitted from the power factor correction IC 35*b*, 35*c*, 35*e*, 35*f* as well.

In addition, the correction circuit 64*a* includes the arithmetic circuit 71 configured to calculate the ratio by dividing the time period Ton2 by the time period Toff, the correction value output circuit 72 configured to output a correction value ΔTon obtained by multiplying the predetermined time period Tzcd by the ratio, and the second command value output circuit 73 configured to output the second command value Vc2, based on the first command value Vc1 and the correction value ΔTon.

This enables the correction circuit 64*a* to calculate the second command value Vc2 for setting the time period Ton2 to the driver circuit 56, without using the voltages Vfb and Vr as inputs to the correction circuit 64*a*.

In addition, the correction circuit 64*b* includes the estimation circuit 81 configured to calculate the estimated value Vres1 of the rectified voltage Vr, based on the time period Ton2, the time period Toff, and the voltage Vfb, the arithmetic circuit 82 configured to compute the ratio, based on the estimated value Vres1 and the voltage Vfb, the correction value output circuit 83 configured to output a correction value ΔTon obtained by multiplying the predetermined time period Tzcd by the ratio, and the second command value output circuit 84 configured to output the second command value, based on the first command value Vc1 and the correction value.

This enables the correction circuit 64*b* to calculate the second command value Vc2 for setting the time period Ton2 to the driver circuit 56, without using the voltage Vr as an input to the correction circuit 64*b*.

In addition, the power factor correction IC 35*c*, 35*g* has the terminal RDIV configured to receive the voltage Vrdiv corresponding to the rectified voltage Vr, and the ratio is calculated based on the voltage Vfb and the voltage Vrdiv.

This makes it possible to directly calculate, based on the voltage Vfb and the voltage Vrdiv, the ratio that is based on the rectified voltage Vr and the output voltage Vout.

In addition, the correction circuit 64*c* includes the arithmetic circuit 91 configured to calculate the ratio, based on the voltage Vfb and the voltage Vrdiv applied to the terminal RDIV, the correction value output circuit 92 configured to output a correction value ΔTon obtained by multiplying the predetermined time period Tzcd by the ratio, and the second command value output circuit 93 configured to output the second command value Vc2, based on the first command value Vc1 and the correction value ΔTon.

As such, a description is given of the arithmetic circuit 91 that directly calculates, based on the voltage Vfb and the voltage Vrdiv, the ratio that is based on the rectified voltage Vr and the output voltage Vout, and a configuration for specifically outputting a second command value Vc2, based on a result of the arithmetic operation by the arithmetic circuit 91.

In another aspect of the present disclosure, the power factor correction IC 35*b*, 35*f*, 35*h*, 35*i* delays the on signal Son1 for the NMOS transistor 36, based on the time period Toff during which the NMOS transistor 36 is off, an estimated value of the rectified voltage Vr in the AC-DC converter, and the voltage Vfb.

This enables the driver circuit 56 to turn on and off the NMOS transistor 36 at appropriate timings, based on the time period Toff, the estimated value of the rectified voltage Vr, and the voltage Vfb, thereby being able to correct the power factor.

In addition, the rectified voltage estimation circuit 66*a*, 66*b*, 66*c* includes the peak determination circuit 111*a* or 111*b* configured to determine the peak value Toffp of the time period Toff, based on the time period Toff, the amplitude estimation circuit 112 configured to estimate the amplitude Vrp of the rectified voltage Vr, based on the voltage Vfb, the peak value Toffp of the time period Toff, and the time period Ton2, and the output circuit 115 configured to output the estimated value Vres2 of the rectified voltage Vr, based on the estimated amplitude Vrp.

This enables the rectified voltage estimation circuit 66*a*, 66*b*, 66*c* to provide an estimated value of the rectified voltage Vr, without using the value of the time period Toff when the rectified voltage Vr is in a low phase. Accordingly, the rectified voltage estimation circuit 66*a*, 66*b*, 66*c* can estimate the rectified voltage Vr more accurately.

In addition, the rectified voltage estimation circuit 66*a*, 66*b*, 66*c* includes the frequency estimation circuit 113*a*, 113*b* configured to estimate the frequency ω of the rectified voltage Vr. The peak determination circuit 111*a*, 111*b* determines the peak value Toffp of the time period Toff, every time the time period Toff peaks. The frequency estimation circuit 113*a*, 113*b* estimates the frequency ω of the rectified voltage Vr, based on a result of the determination by the peak determination circuit 111*a*, 111*b*, and the output circuit 115 outputs the rectified voltage Vr, based on the estimated frequency ω.

This enables the frequency estimation circuit 113*a*, 113*b* to measure the time period between the timings of the peak values Toffp, to thereby estimate the half period Tin of the rectified voltage Vr. The output circuit 115 can output the waveform $|\sin(\omega \times t + \theta)|$ of the rectified voltage Vr, based on the frequency ω estimated by the frequency estimation circuit 113*a*, 113*b*.

In addition, the rectified voltage estimation circuit 66*a*, 66*b*, 66*c* includes the phase output circuit 114 configured to estimate the phase of the rectified voltage Vr, based on the result of the determination of the peak determination circuit 111*a*, 111*b* and the estimated frequency 107, and the output circuit 115 outputs the estimated rectified voltage Vr, based on the estimated phase.

This enables the phase output circuit 114 to estimate the phase angle of the rectified voltage Vr, based on the half period Tin and the time period having elapsed since the peak value Toffp, assuming that the phase angle of the rectified voltage Vr at the peak value Toffp is 90+180 m degrees. Accordingly, the waveform output circuit 121 can output the waveform $|\sin(\omega \times t + \theta)|$ of the rectified voltage Vr, based on the phase information outputted from the phase output circuit 114.

The peak determination circuit 111*b* outputs the peak value Toffpk, when the time period T2−T1 between the peak value Toffpk and the peak value Toffpk−1 corresponding to a peak value previous to the peak value Toffpk is within a range of 20% of the half period Tin of the rectified voltage Vr, and outputs, as a new peak value, the third time period Toff, which is a time period from the peak value Toffpk−1 to when the half period Tin has elapsed, when the time period T2−T1 is not within the range of 20% of the half period Tin.

Accordingly, when the time period T2–T1 between peaks is greatly deviates from the half period Tin of the rectified voltage Vr, the rectified voltage estimation circuit 66b determines that the peak value Toffpk is an outlier due to erroneous detection caused by noise and/or the like. Accordingly, the rectified voltage estimation circuit 66b can execute the process of screening a peak value so as not to output an outlier.

In addition, the rectified voltage estimation circuit 66c includes the storage circuit 117 configured to have recorded therein the waveform data on the rectified voltage Vr with the normalized amplitude Vrp, and the output circuit 115 outputs the estimated rectified voltage Vr using the waveform data.

This enables the rectified voltage estimation circuit 66c to estimate the rectified voltage Vr without estimating, in detail, the waveform of the rectified voltage Vr and the frequency or the phase for determining the waveform.

In addition, the correction circuit 64d includes the arithmetic circuit 131 configured to calculate the ratio, based on the estimated rectified voltage Vr and the voltage Vfb, the correction value output circuit 132 configured to output a correction value ΔTon by multiplying the time period Tzcd by the ratio, and the second command value output circuit 133 configured to output the second command value Vc2, based on the first command value Vc1 and the correction value ΔTon.

This enables the correction circuit 64d to calculate the correction value ΔTon, without using the value of the time period Toff when the rectified voltage Vr is in a low phase. Accordingly, an appropriate time period Ton2 during which the NMOS transistor 36 is on can be set even when the rectified voltage Vr is in a low phase.

Further, another aspect of the present disclosure provides the AC-DC converter 10b, 10c that generates the output voltage Vout at a target level from the AC voltage Vac inputted thereto and that comprises the inductor 33 configured to receive the rectified voltage Vr corresponding to the AC voltage Vac, the NMOS transistor 36 configured to control the inductor current IL2 flowing through the inductor 33, and the power factor correction IC 35b, 35c, 35d, 35e, 35f, 35g configured to control switching of the NMOS transistor 36.

As such, a description is given of a configuration of the AC-DC converter including an IC capable of improving the power factor by obtaining the on time period Ton2 of the NMOS transistor 36 by correcting, without excess or deficiency, the amount of decrease in the inductor current IL2 associated with the delay of the on signal Son1.

Another aspect of the present disclosure provides the AC-DC converter 10b, 10c that generates the output voltage Vout at a target level from the AC voltage Vac inputted thereto and that comprises the power factor correction IC 35b, 35f, 35h, 35i. The power factor correction IC 35b, 35f, 35h, 35i delays the on signal Son1 for the NMOS transistor 36, based on the time period Toff during which the NMOS transistor 36 is off, the estimated value of the rectified voltage Vr in the AC-DC converter, and the voltage Vfb.

Accordingly, it is possible to provide an AC-DC convertor including a power factor correction IC capable of correcting power factor by causing the driver circuit 56 to turn on and off the NMOS transistor 36 at appropriate timings, based on the time period Toff, the estimated value of the rectified voltage Vr, and the voltage Vfb.

The present disclosure is directed to provision of a power supply circuit and an integrated circuit capable of correcting the power factor of the power supply circuit.

The present disclosure can provide a power supply circuit and an integrated circuit capable of correcting the power factor of the power supply circuit.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

It should be noted that the operations, procedures, steps, stages, and the like in each process in a device, a system, a program, and a method described in the claims, the specification, and the drawings may be performed in any order, unless a term such as "before", "prior to" or the like is explicitly used or an output of a previous process is used in a subsequent process. Even if terms such as "first", "next", and/or the like are used, for convenience, with respect to an operation flowchart in the claims, the specification, and the drawings, this does not mean that the flowchart needs to be performed in that order.

What is claimed is:

1. An integrated circuit for a power supply circuit that generates an output voltage at a target level from an alternating current (AC) voltage inputted thereto, the power supply circuit including
    an inductor configured to receive a rectified voltage corresponding to the AC voltage, and
    a transistor configured to control an inductor current flowing through the inductor,
the integrated circuit being configured to control switching of the transistor, the integrated circuit comprising:
    a first command value output circuit configured to output a first command value to turn on the transistor for a first time period, based on a difference between a first voltage corresponding to the output voltage and a reference voltage;
    an on signal output circuit configured to output an on signal to turn on the transistor, in response to the inductor current decreasing to or below a predetermined value after turning-off of the transistor;
    a delay circuit configured to delay the on signal by a predetermined time period to thereby generate a delayed on-signal;
    a correction circuit configured to correct the first command value, to output a resultant value as a second command value to turn on the transistor for a second time period longer than the first time period; and
    a driver circuit configured to turn on the transistor based on the delayed on-signal, and turn off the transistor based on the second command value, wherein
    the correction circuit corrects the first command value based on the predetermined time period and a ratio, the ratio being based on
        the second time period, and
        a third time period that is a time period from when the transistor is turned off to when the inductor current reaches the predetermined value.

2. The integrated circuit according to claim 1, further comprising:
    a first terminal configured to receive a second voltage corresponding to the predetermined time period; and
    a delay time period setting circuit configured to set the predetermined time period for the delay circuit, based on the second voltage.

3. The integrated circuit according to claim 2, further comprising a bias current source configured to supply a predetermined current to the first terminal, wherein the first terminal is configured to have a resistor coupled thereto.

4. The integrated circuit according to claim 1, wherein the predetermined time period is determined based on an inductance of the inductor and a capacitance of a capacitor that resonates the inductor current together with the inductor.

5. The integrated circuit according to claim 4, further comprising a first storage circuit configured to record the predetermined time period corresponding to the inductance and the capacitance.

6. The integrated circuit according to claim 1, comprising a detection circuit configured to detect a first timing at which the transistor is turned off and a second timing at which the inductor current reaches the predetermined value, to thereby detect the third time period.

7. The integrated circuit according to claim 6, wherein the correction circuit includes
an arithmetic circuit configured to calculate the ratio by dividing the second time period by the third time period,
a correction value output circuit configured to multiply the predetermined time period by the ratio, to thereby output a correction value, and
a second command value output circuit configured to generate the second command value based on the first command value and the correction value.

8. The integrated circuit according to claim 6, wherein the correction circuit includes
an estimation circuit configured to calculate an estimated value of the rectified voltage, based on the second time period, the third time period, and the first voltage,
an arithmetic circuit configured to calculate the ratio, based on the estimated value and the first voltage,
a correction value output circuit configured to multiply the predetermined time period by the ratio, to thereby output a correction value, and
a second command value output circuit configured to generate the second command value based on the first command value and the correction value.

9. The integrated circuit according to claim 1, further comprising a second terminal configured to receive a third voltage corresponding to the rectified voltage, wherein
the ratio is calculated based on the first voltage and the third voltage.

10. The integrated circuit according to claim 9, wherein the correction circuit includes
an arithmetic circuit configured to calculate the ratio, based on the third voltage applied to the second terminal and the first voltage,
a correction value output circuit configured to multiply the predetermined time period by the ratio, to thereby output a correction value, and
a second command value output circuit configured to generate the second command value based on the first command value and the correction value.

11. A power supply circuit configured to generate an output voltage at a target level from an alternating current (AC) voltage inputted thereto, the power supply circuit comprising:
an inductor configured to receive a rectified voltage corresponding to the AC voltage;
a transistor configured to control an inductor current flowing through the inductor; and
an integrated circuit configured to control switching of the transistor, wherein
the integrated circuit includes
a first command value output circuit configured to output a first command value to turn on the transistor for a first time period, based on a difference between a first voltage corresponding to the output voltage and a reference voltage,
an on signal output circuit configured to output an on signal to turn on the transistor, in response to the inductor current decreasing to or below a predetermined value after turning-off of the transistor,
a delay circuit configured to delay the on signal by a predetermined time period to thereby generate a delayed on-signal,
a correction circuit configured to correct the first command value, to output a resultant value as a second command value to turn on the transistor for a second time period longer than the first time period, and
a driver circuit configured to turn on the transistor based on the delayed on-signal, and turn off the transistor based on the second command value, and wherein
the correction circuit corrects the first command value, based on the predetermined time period and a ratio, the ratio being based on
the second time period, and
a third time period that is a time period from when the transistor is turned off to when the inductor current reaches the predetermined value.

* * * * *